US012788201B2

(12) United States Patent
Kim et al.

(10) Patent No.: US 12,788,201 B2
(45) Date of Patent: Nov. 10, 2026

(54) VACUUM CLEANER

(71) Applicant: LG ELECTRONICS INC., Seoul (KR)

(72) Inventors: Misol Kim, Seoul (KR); Jinhyouk Shin, Seoul (KR); Dongjae Lee, Seoul (KR); Hwayeong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 271 days.

(21) Appl. No.: 18/835,458

(22) PCT Filed: Feb. 8, 2023

(86) PCT No.: PCT/KR2023/001761
§ 371 (c)(1),
(2) Date: Aug. 2, 2024

(87) PCT Pub. No.: WO2023/153771
PCT Pub. Date: Aug. 17, 2023

(65) Prior Publication Data

US 2025/0134336 A1 May 1, 2025

(30) Foreign Application Priority Data

Feb. 8, 2022 (KR) ........................ 10-2022-0016217

(51) Int. Cl.
*A47L 11/40* (2006.01)
*A47L 11/30* (2006.01)
*F21V 33/00* (2006.01)

(52) U.S. Cl.
CPC ......... *A47L 11/4094* (2013.01); *A47L 11/305* (2013.01); *A47L 11/4005* (2013.01);
(Continued)

(58) Field of Classification Search
CPC ............. A47L 11/4094; A47L 11/4063; A47L 11/305; A47L 11/4005; A47L 11/4008;
(Continued)

(56) References Cited

U.S. PATENT DOCUMENTS 9,314,140 B2 * 4/2016 Eriksson ................... A47L 9/02
10,117,553 B2 * 11/2018 Eriksson ............... A47L 9/0477
(Continued)

FOREIGN PATENT DOCUMENTS

JP 2013-233198 11/2013
JP 2018-094021 6/2018
(Continued)

OTHER PUBLICATIONS

Extended European Search Report dated Jul. 28, 2025, issued in Application No. 23753119.9.
(Continued)

*Primary Examiner* — Monica L Perry
(74) *Attorney, Agent, or Firm* — KED & ASSOCIATES, LLP

(57) ABSTRACT

The present disclosure relates to a cleaner, and a cleaner according to an embodiment of the present disclosure includes a main body, and a cleaning nozzle separably connected to the main body, in which the main body includes a battery configured to supply power, an operating part including at least one input button, and a main body control unit configured to receive a user input for manipulating the input button and transmit a control instruction to the cleaning nozzle when the cleaning nozzle is connected to the main body, and in which the cleaning nozzle includes a nozzle control unit configured to receive the control instruction through a power line connected to the main body control unit, and at least one operation part configured such that an
(Continued)

operation of the operation part related to a function of the cleaning nozzle is controlled by the nozzle control unit.

11 Claims, 13 Drawing Sheets

(52) U.S. Cl.
CPC ....... *A47L 11/4008* (2013.01); *A47L 11/4011* (2013.01); *A47L 11/4069* (2013.01); *A47L 11/4088* (2013.01); *F21V 33/0044* (2013.01)

(58) Field of Classification Search
CPC .............. A47L 11/4011; A47L 11/4069; A47L 11/4088; A47L 9/2831; A47L 9/2857; A47L 9/02
See application file for complete search history.

(56) References Cited

U.S. PATENT DOCUMENTS

| | | | | |
|---|---|---|---|---|
| 10,376,114 | B2 * | 8/2019 | Eriksson | A47L 9/02 |
| 11,284,767 | B2 * | 3/2022 | Nguyen | A47L 11/201 |
| 2014/0331446 | A1 * | 11/2014 | Eriksson | A47L 9/02 15/383 |
| 2015/0208888 | A1 * | 7/2015 | Eriksson | A47L 9/02 15/383 |
| 2025/0064278 | A1 * | 2/2025 | Cho | A47L 7/0023 |
| 2025/0134336 | A1 * | 5/2025 | Kim | A47L 9/2805 |
| 2025/0295284 | A1 * | 9/2025 | Jang | A47L 11/40 |

FOREIGN PATENT DOCUMENTS

| | | | |
|---|---|---|---|
| JP | 2019-166255 | 10/2019 | |
| KR | 10-2009-0101787 | 9/2009 | |
| KR | 10-2020-0013505 | 2/2020 | |
| KR | 20210105836 | 8/2021 | |
| KR | 10-2021-0112917 | 9/2021 | |
| KR | 20210112917 A * | 9/2021 | A47L 11/4063 |
| KR | 102312759 | 10/2021 | |

OTHER PUBLICATIONS

International Search Report dated May 15, 2023 issued in Application No. PCT/KR2023/001761.

* cited by examiner

[FIG. 1]
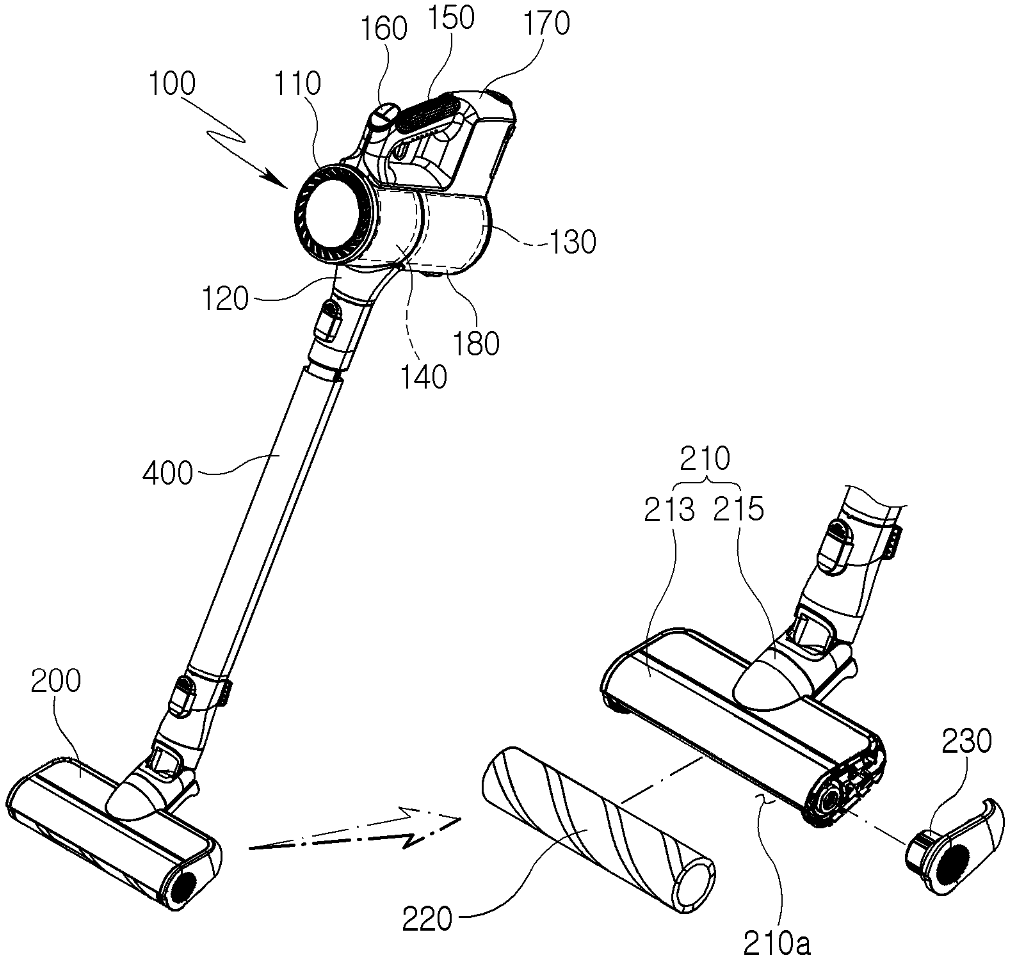

[FIG. 2]
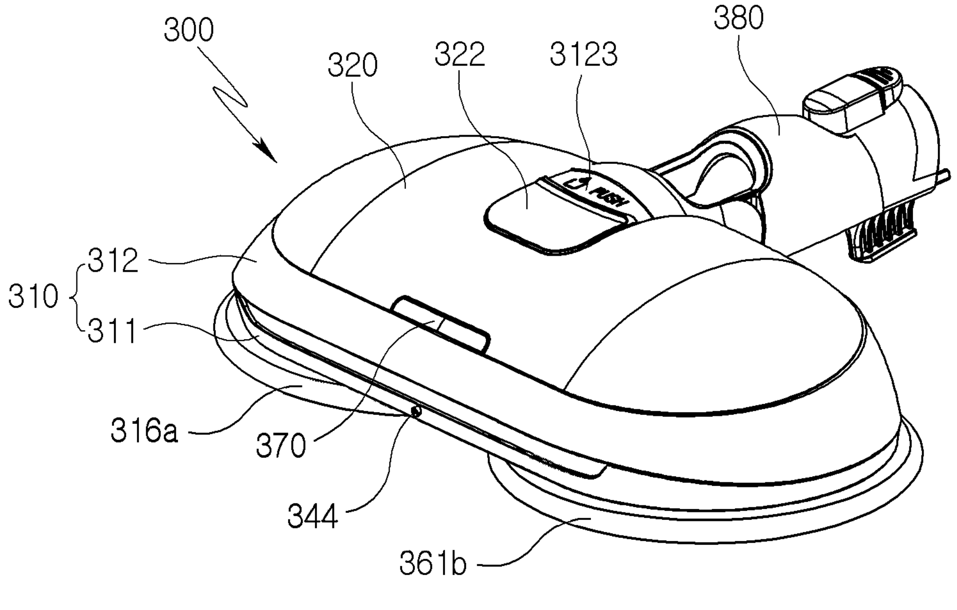

[FIG. 3]
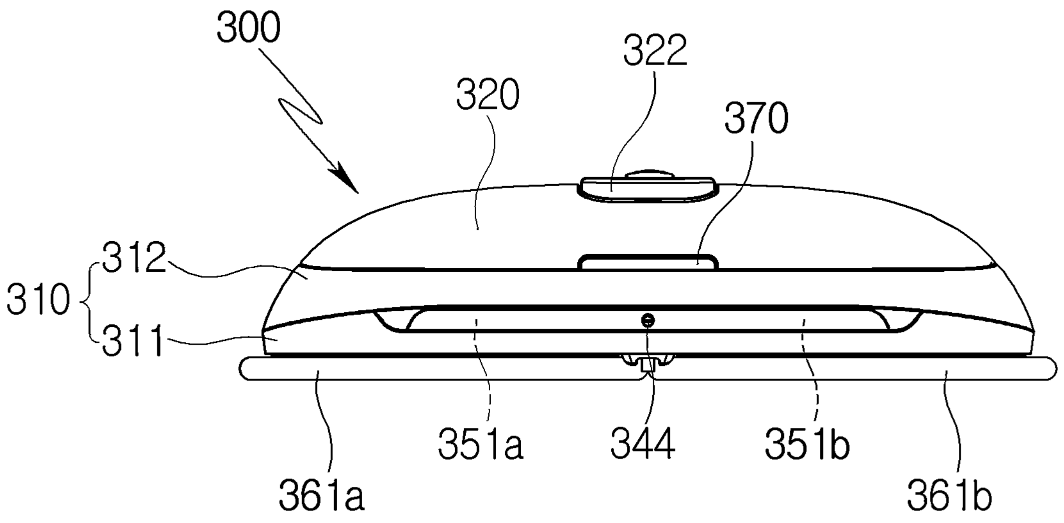

[FIG. 4]
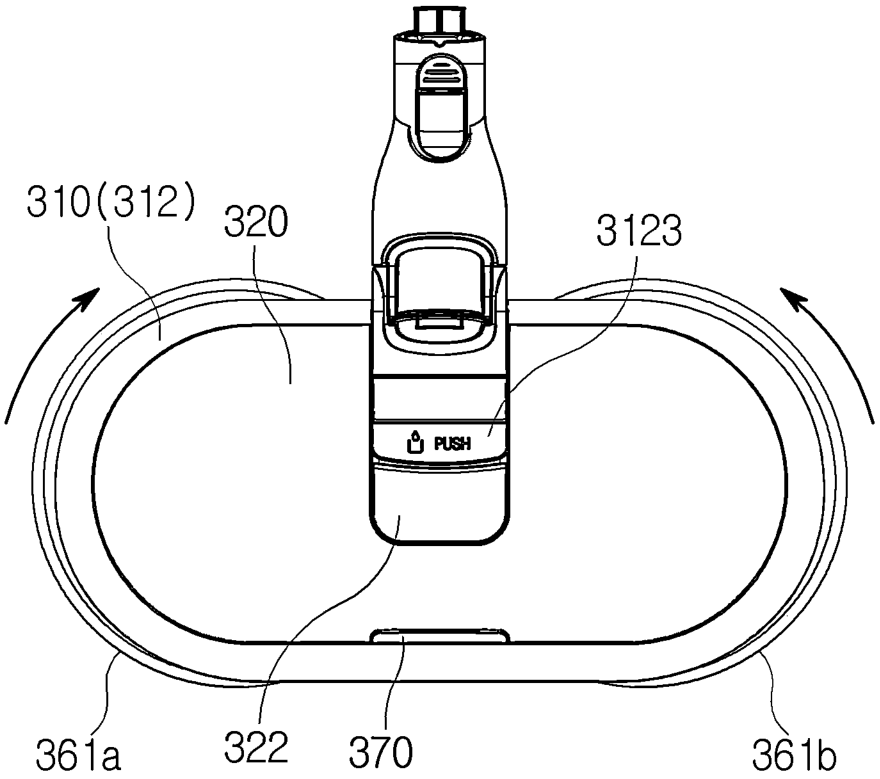

[FIG. 5]
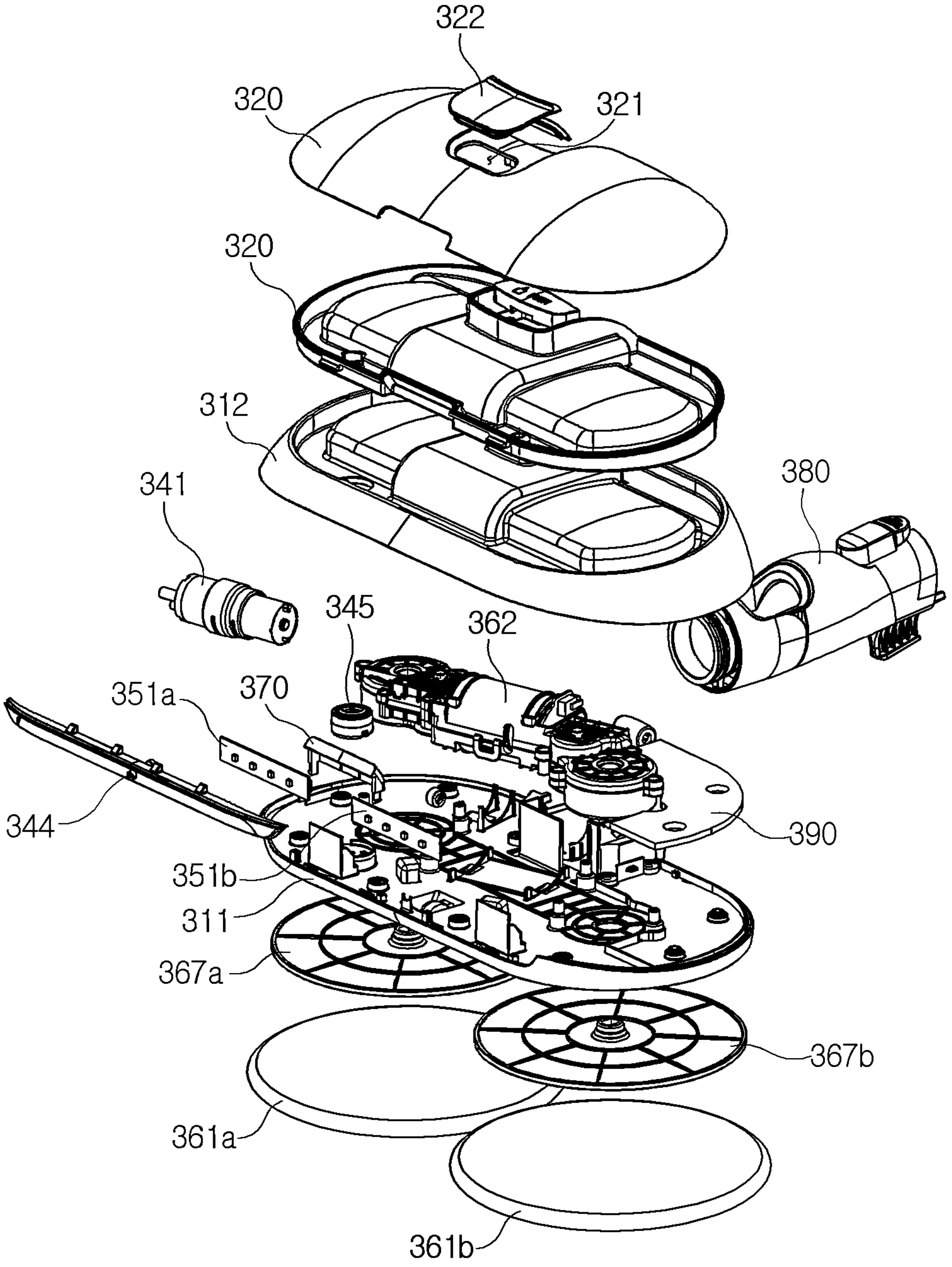

[FIG. 6]
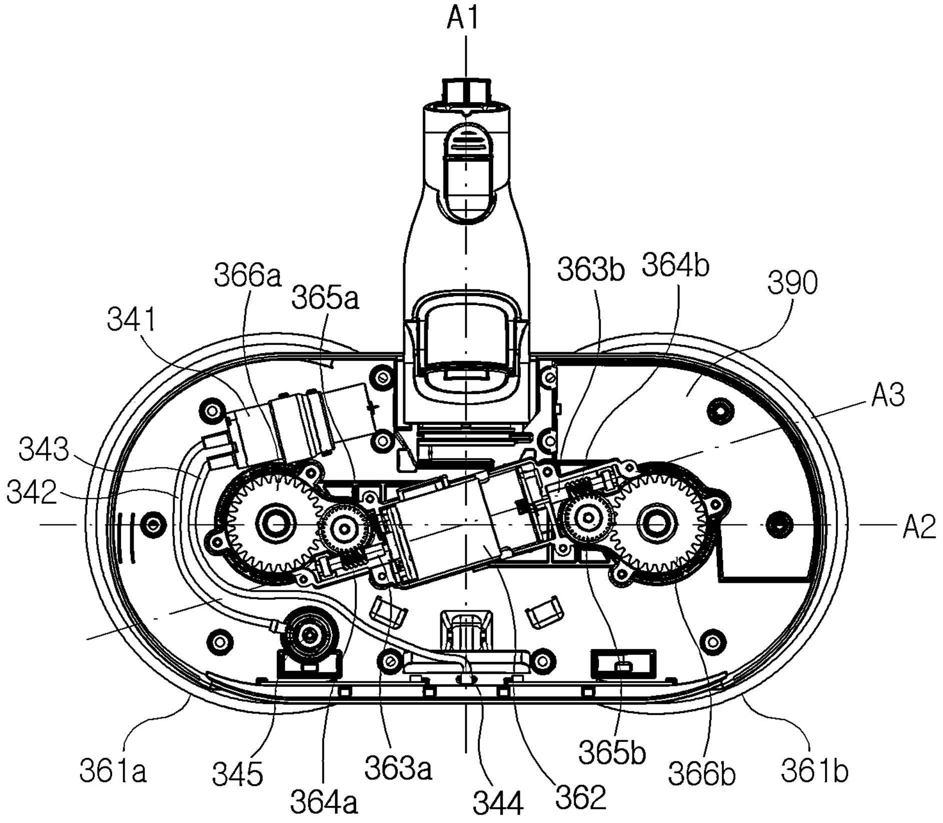

[FIG. 7]
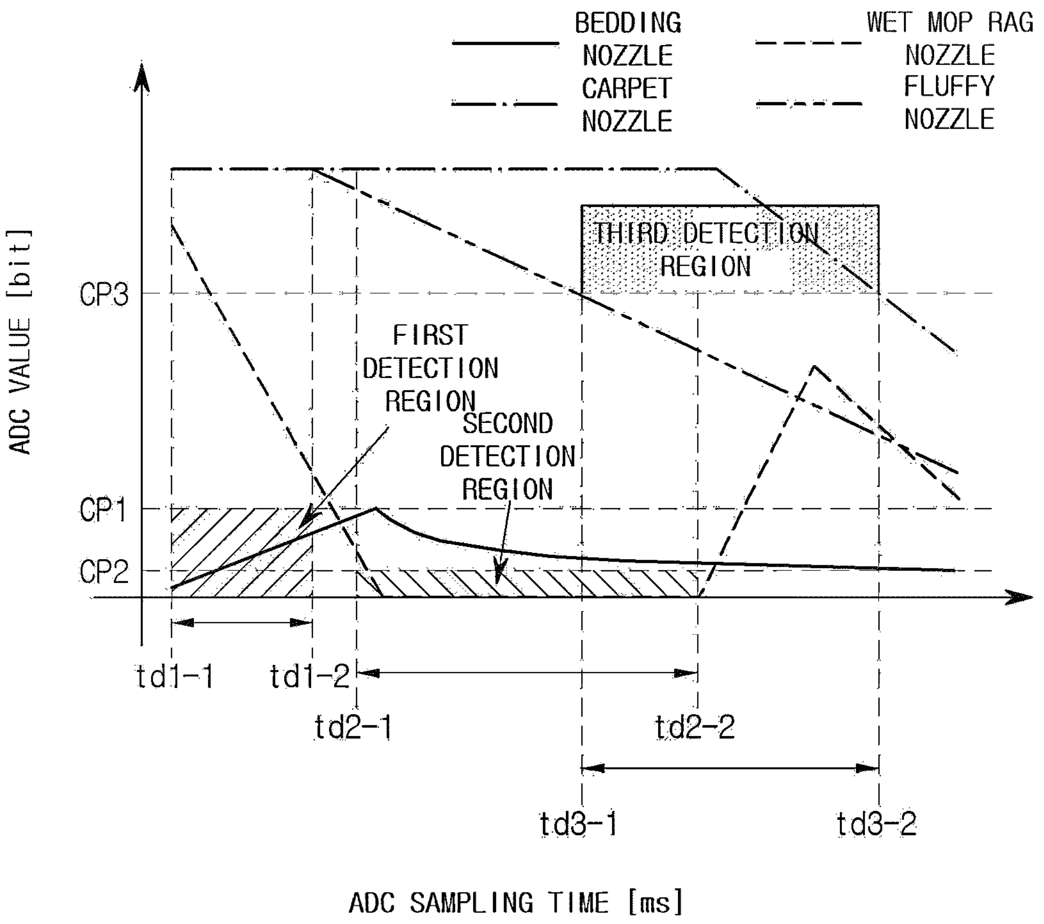

[FIG. 8]
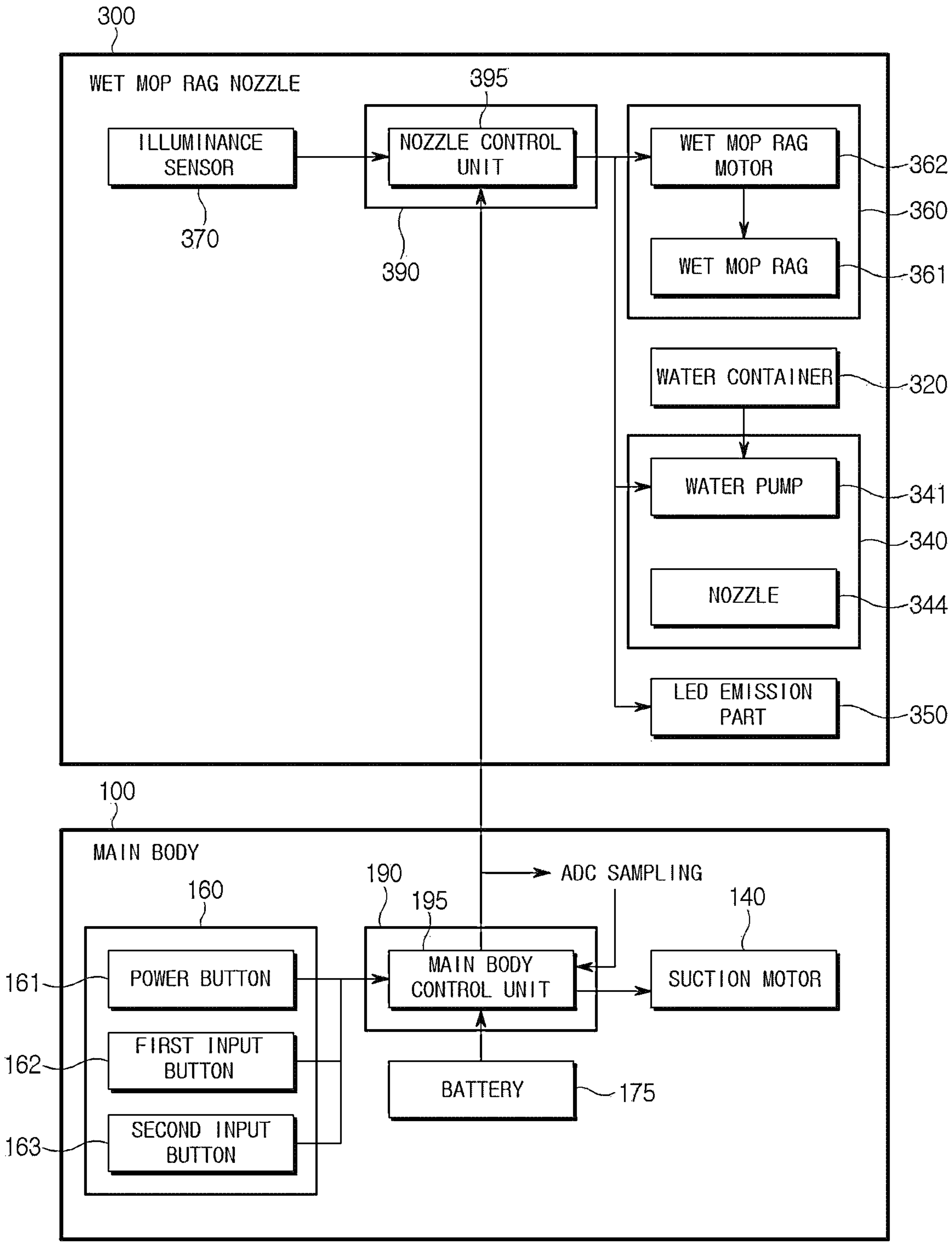

[FIG. 9]
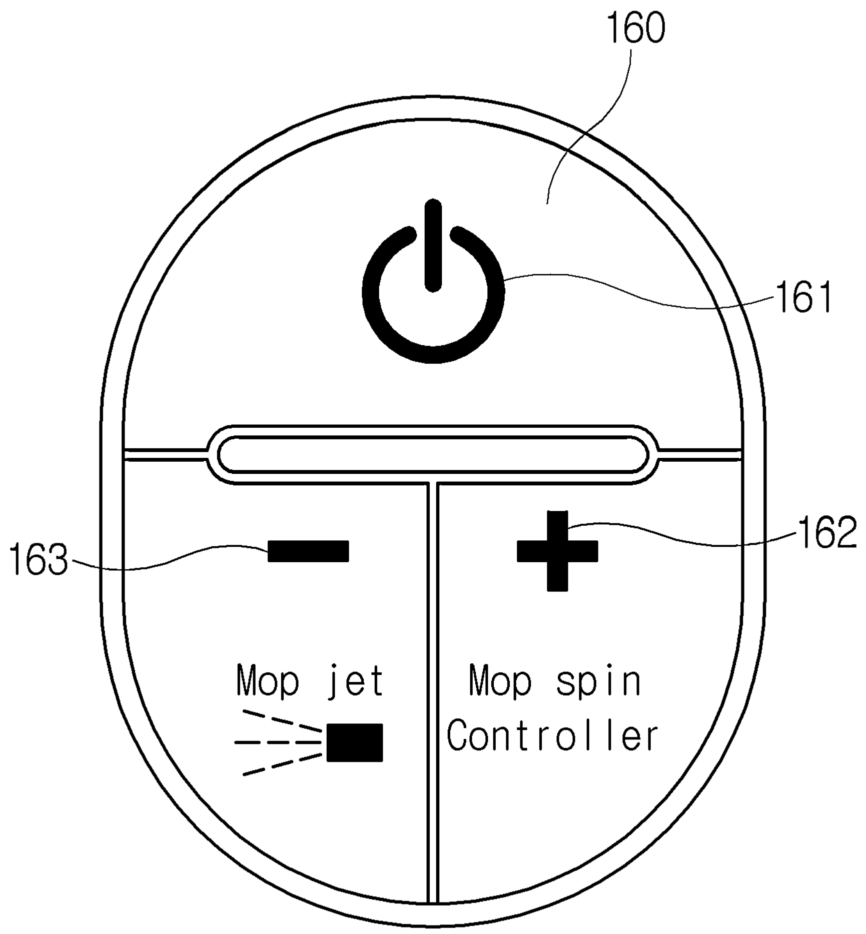

[FIG. 10]
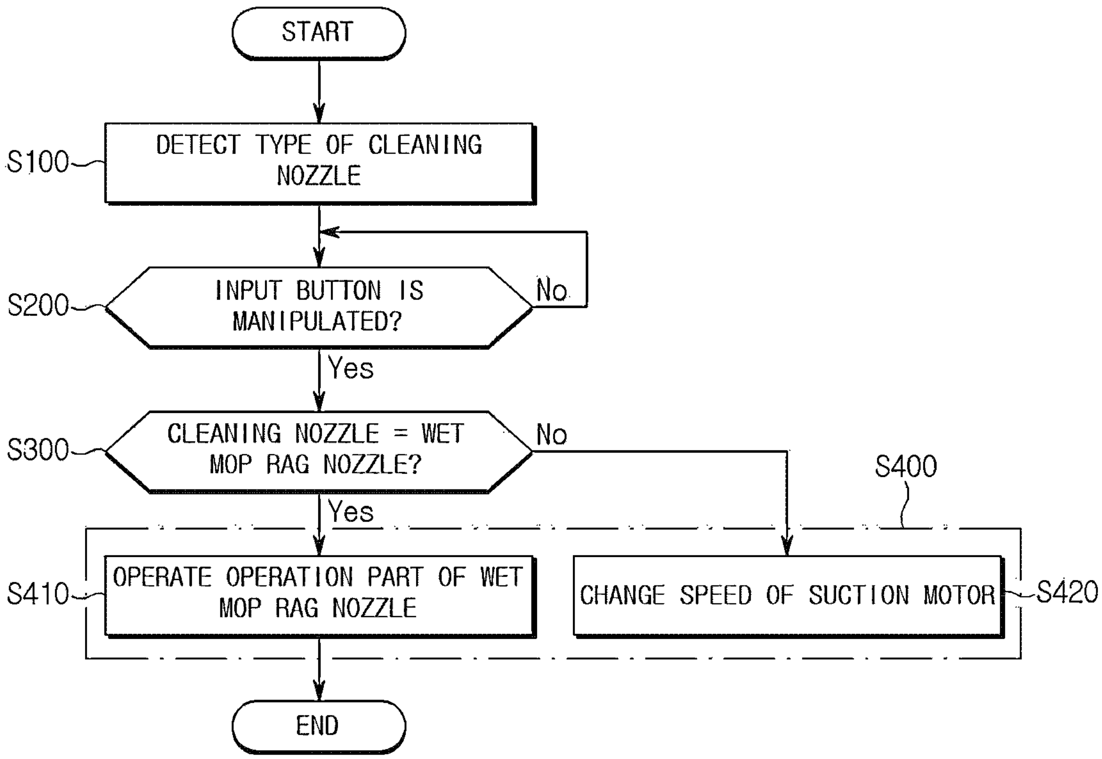

[FIG. 11]
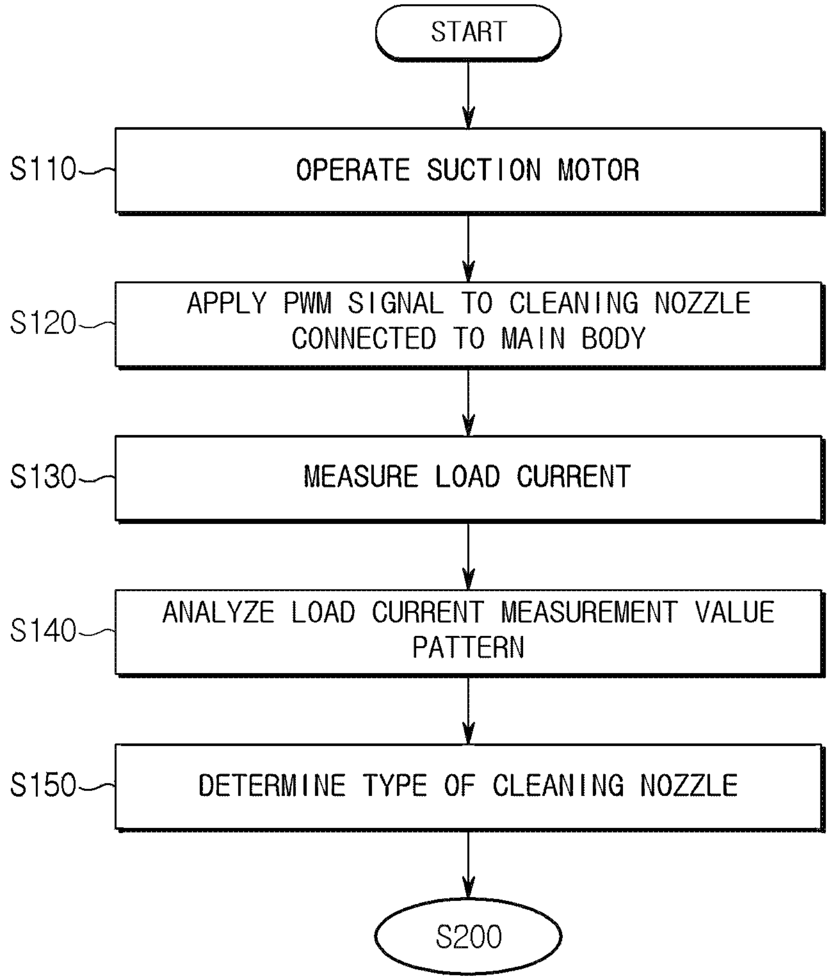

[FIG. 12]
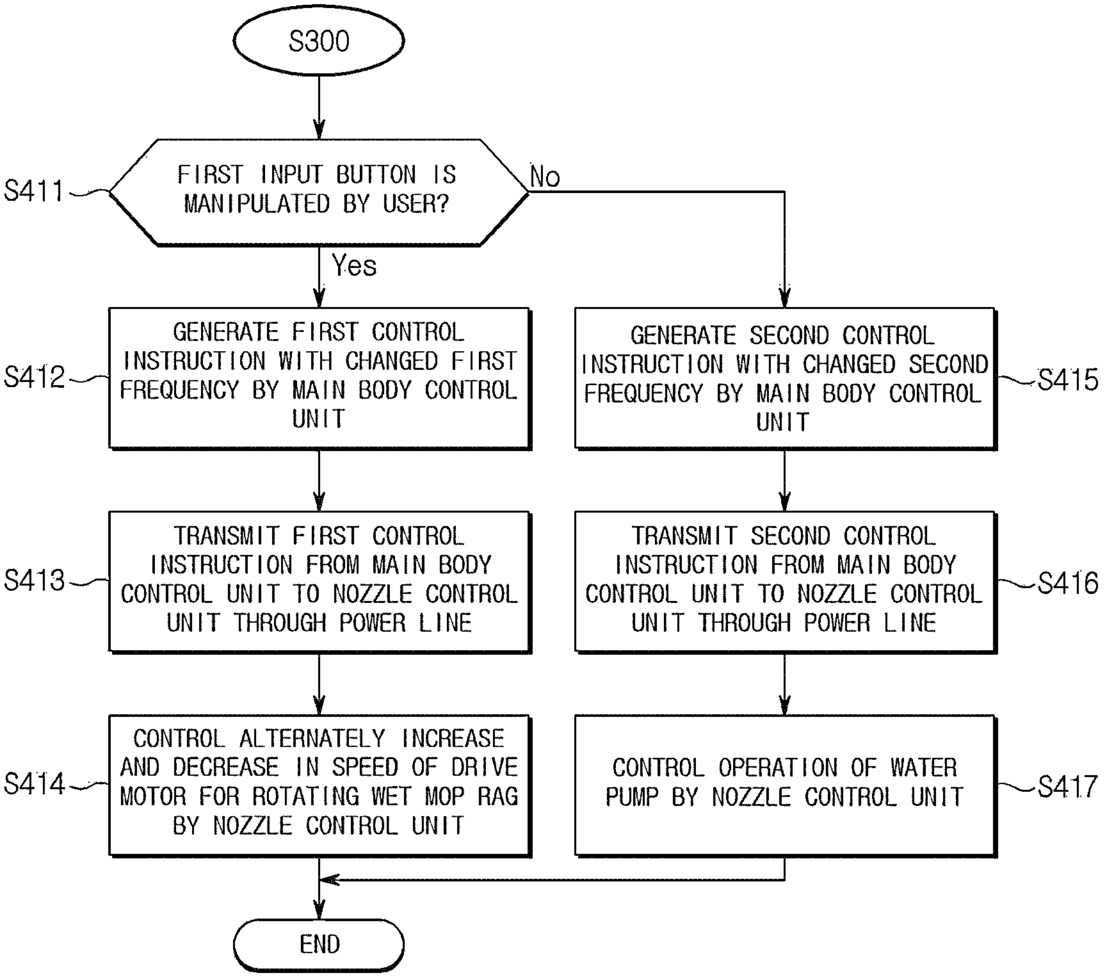

[FIG. 13]
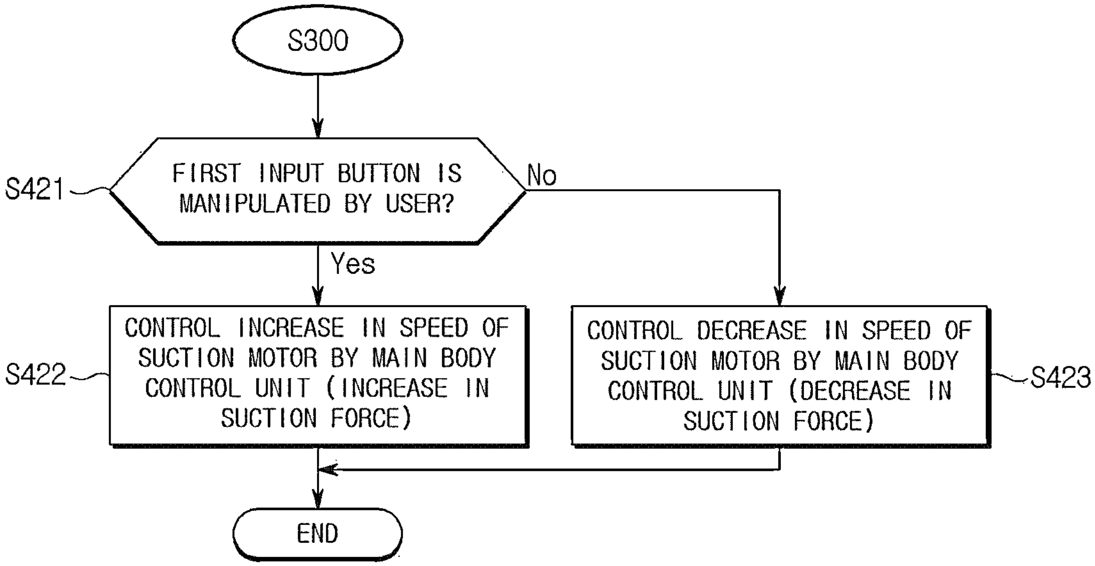

VACUUM CLEANER

CROSS-REFERENCE TO RELATED PATENT APPLICATIONS

This application is a U.S. National Stage Application under 35 U.S.C. § 371 of PCT Application No. PCT/KR2023/001761, filed Feb. 8, 2023, which claims priority to Korean Patent Application No. 10-2022-0016217, filed Feb. 8, 2022, whose entire disclosures are hereby incorporated by reference.

TECHNICAL FIELD

The present disclosure relates to a cleaner. More specifically, the present disclosure relates to a cleaner capable of controlling operations of various cleaning nozzles even by using a limited number of input buttons.

BACKGROUND ART

In general, a cleaner refers to an electrical appliance that draws in small garbage or dust by sucking air using electricity and fills a dust bin provided in a product with the garbage or dust. Such a cleaner is generally called a vacuum cleaner.

The cleaners may be classified into a manual cleaner which is moved directly by a user to perform a cleaning operation, and an automatic cleaner which performs a cleaning operation while autonomously traveling. Depending on the shape of the cleaner, the manual cleaners may be classified into a canister cleaner, an upright cleaner, a handy cleaner, a stick cleaner, and the like.

The canister cleaners were widely used in the past as household cleaners. However, recently, there is an increasing tendency to use the handy cleaner and the stick cleaner in which a dust bin and a cleaner main body are integrally provided to improve convenience of use.

In the case of the canister cleaner, a main body and a suction port are connected by a rubber hose or pipe, and in some instances, the canister cleaner may be used in a state in which a brush is fitted into the suction port.

The handy cleaner (hand vacuum cleaner) has maximized portability and is light in weight. However, because the handy cleaner has a short length, there may be a limitation to a cleaning region. Therefore, the handy cleaner is used to clean a local place such as a desk, a sofa, or an interior of a vehicle.

A user may use the stick cleaner while standing and thus may perform a cleaning operation without bending his/her waist. Therefore, the stick cleaner is advantageous for the user to clean a wide region while moving in the region. The handy cleaner may be used to clean a narrow space, whereas the stick cleaner may be used to clean a wide space and also used to a high place that the user's hand cannot reach. Recently, modularized stick cleaners are provided, such that types of cleaners are actively changed and used to clean various places.

The modularized stick cleaner may be implemented by connecting different types of cleaning nozzles to a main body. The cleaning nozzles may be broadly classified into a suction nozzle configured to serve to suck dust on a cleaning target surface and a wet mop rag nozzle configured to serve to rub and wipe a cleaning target surface. In this case, the suction nozzles may also be classified into a carpet nozzle, a bedding nozzle, a fluffy nozzle, and the like depending on the use thereof.

The main body of the stick cleaner is generally equipped with an operating part including a power button and one or more input buttons. A suction force of a suction motor mounted in the main body may be adjusted by the input buttons, such that a cleaning target surface, which requires a high suction force, is easily cleaned.

In case that various cleaning nozzles capable of being connected to the main body are provided to be replaceable, the plurality of input buttons may be provided, and various functions of the cleaning nozzles may be controlled, such that the user's convenience may be further improved. For example, in case that the user may directly manipulate and control a speed of a wet mop rag when the cleaning nozzle is the wet mop rag nozzle, the user may adjust the speed of the rag while directly visually identifying a degree of contamination of the cleaning target surface, which may improve cleaning satisfaction.

The operating part may be disposed on a handle so that the user may easily manipulate the operating part while gripping the cleaner. However, a space of the handle is too narrow to provide the plurality of input buttons on the handle.

Korean Patent Application Laid-Open No. 10-2020-0013505, which is a preceding document, discloses a cleaner nozzle that automatically controls a rotational speed of a wet mop rag by detecting a rotational speed of a drive motor configured to operate the wet mop rag. According to the preceding document, rotational speeds of drive motors of left and right wet mop rags are detected, and the two opposite wet mop rags are controlled to rotate at similar speeds, such that a user may switch a traveling direction of a nozzle main body without applying a great effort during a cleaning process.

However, according to the preceding document, because the wet mop rag is automatically controlled to rotate within a predetermined speed range, there is still inconvenience because the user cannot directly control the speed of the wet mop rag.

Further, in the stick cleaner in the related art, the electrical connection between the main body and the cleaning nozzle is implemented by two lines, i.e., a power line and a communication line to transmit power. That is, the power supplied from the battery is transmitted to the cleaning nozzle through the power line, and a control instruction generated by a main body control unit is transmitted to the cleaning nozzle through the communication line.

In particular, as described above, in the case of the stick cleaner in which not only the suction nozzle but also the wet mop rag nozzle may be connected to the main body, it is essential to transmit the control instruction through the communication line to control a fluid spray of the wet mop rag nozzle and control a rotational speed of the wet mop rag.

In this case, it is necessary to change a connection pipe to apply a communication line for wired communication. Even in case that wireless communication is adopted to transmit the control instruction without adding a communication line, a communication module (RF, WiFi, or the like) for the wireless communication needs to be installed, such that there are a structural limitation and a cost constraint.

DISCLOSURE

Technical Problem

An object of the present disclosure is to provide a cleaner capable of controlling various functions of a cleaning nozzles connected to a main body by using a limited number of input buttons.

Another object of the present disclosure is to provide a cleaner capable of transmitting a control instruction, which is generated by a main body, to a cleaning nozzle only through power line communication without adding a communication line or a wireless communication module.

Technical Solution

In order to achieve the above-mentioned objects, an embodiment of the present disclosure provides a cleaner including: a main body; and a cleaning nozzle separably connected to the main body, in which the main body includes: a battery configured to supply power; an operating part including at least one input button; and a main body control unit configured to receive a user input for manipulating the input button and transmit a control instruction to the cleaning nozzle when the cleaning nozzle is connected to the main body.

The cleaning nozzle may include: a nozzle control unit configured to receive the control instruction through a power line connected to the main body control unit; and at least one operation part configured such that an operation of the operation part related to a function of the cleaning nozzle is controlled by the nozzle control unit.

The main body control unit may apply power, which is supplied from the battery, to the cleaning nozzle when the cleaning nozzle is connected to the main body and initially operates.

The main body control unit may detect the type of the cleaning nozzle based on a measurement value pattern of a load current applied to the cleaning nozzle.

The main body control unit may generate the control instruction by changing a voltage, which is supplied from the battery, to a PWM signal.

The PWM signal generated by the main body control unit may change a switching frequency depending on the type of the input button manipulated by the user.

The cleaning nozzle may include a plurality of operation parts.

The nozzle control unit may control an operation part matched with the received switching frequency among the plurality of operation parts.

The cleaning nozzle may be a wet mop rag nozzle.

The cleaning nozzle, as the operation part, may include: a fluid spray part configured to spray a fluid by operating a water pump.

The cleaning nozzle, as the operation part, may include: a wet mop rag rotation part configured to rotate at least one wet mop rag by operating a wet mop rag motor.

The operating part may include a first input button and a second input button.

The nozzle control unit may control a magnitude of an output of the wet mop rag motor so that a rotational speed of the wet mop rag is changed when the first input button is manipulated.

The nozzle control unit may control an operation of the water pump to allow the fluid spray part to spray a fluid forward in a traveling direction of the wet mop rag nozzle when the second input button is manipulated.

The nozzle control unit may control the wet mop rag motor so that a rotational speed alternately increases and decreases in comparison with a current rotational speed each time the control instruction based on the manipulation of the first input button is received.

The operation part may further include an LED emission part configured to emit light forward in a movement direction of the wet mop rag nozzle.

The nozzle control unit may control brightness of an LED included in the LED emission part on the basis of illuminance of a periphery of the wet mop rag nozzle.

In order to achieve the above-mentioned objects, another embodiment of the present disclosure provides a cleaner including: a main body; and a cleaning nozzle separably connected to the main body, in which the main body includes: a battery configured to supply power; an operating part including at least one input button; and a suction motor configured to generate a suction force by rotating.

The cleaner may be configured such that an operation according to manipulation of the input button varies depending on the type of the cleaning nozzle connected to the main body.

The operating part may include a first input button and a second input button.

When the cleaning nozzle connected to the main body is a suction nozzle configured to suck dust on a cleaning target surface, a speed of the suction motor may be increased to be higher than a current speed by the manipulation of any one of the first input button and the second input button, and the speed of the suction motor may be decreased to be lower than the current speed by the manipulation of the other of the first input button and the second input button.

The operating part may include a first input button and a second input button.

The cleaning nozzle connected to the main body may be a wet mop rag nozzle including a fluid spray part configured to spray a fluid by operating a water pump, and a wet mop rag rotation part configured to rotate at least one wet mop rag by operating a wet mop rag motor.

A speed of the wet mop rag motor may be changed by the manipulation of the first input button, and the water pump may be operated by the manipulation of the second input button.

The cleaning nozzle may perform control so that a speed of the wet mop rag motor alternately increases and decreases in comparison with a current rotational speed each time the first input button is manipulated by a user.

The main body may apply power, which is supplied from the battery, to the cleaning nozzle when the cleaning nozzle is connected to the main body and initially operates, and the main body may detect the type of the cleaning nozzle based on a measurement value pattern of a load current applied to the cleaning nozzle.

Advantageous Effects

According to the present disclosure, the main body of the cleaner detects the cleaning nozzle connected to the main body by analyzing the load current measurement value pattern and generates different control instructions in accordance with the manipulation of the input button corresponding thereto. Therefore, it is possible to control various functions of the cleaning nozzles connected to the main body by using a limited number of input buttons.

In addition, according to the present disclosure, the different control instructions generated by the main body are converted to have different switching frequencies and transmitted to the cleaning nozzle through the power line communication. Therefore, it is possible to transmit the control instruction, which is generated by the main body, to the cleaning nozzle only through power line communication without adding a communication line or a wireless communication module.

An additional range of the applicability of the present disclosure will become apparent from the following specific configurations for carrying out the present disclosure. However, various alterations and modifications may be clearly understood by those skilled in the art without departing from the spirit and scope of the present disclosure. Accordingly, it should be understood that the detailed description and the specific embodiments such as the exemplary embodiments including the specific configurations for carrying out the present disclosure are just provided for illustrative purposes.

DESCRIPTION OF DRAWINGS

FIG. 1 is a perspective view of a cleaner according to an embodiment of the present disclosure.

FIG. 2 is a perspective view of a wet mop rag nozzle provided to be connected to the cleaner according to the embodiment of the present disclosure.

FIG. 3 is a front view of the wet mop rag nozzle in FIG. 2.

FIG. 4 is a top plan view of the wet mop rag nozzle in FIG. 2.

FIG. 5 is an exploded perspective view of the wet mop rag nozzle in FIG. 2.

FIG. 6 is an interior view of the wet mop rag nozzle in FIG. 2 when viewed from above.

FIG. 7 is a view illustrating an embodiment of a load current measurement value pattern in which a current value is indicated by a value (unit: bit) converted by an ADC with respect to time (unit: ms) sampled from an initial operation of the cleaner after the cleaning nozzle is mounted.

FIG. 8 is a functional block diagram illustrating a case in which a wet mop rag module is connected to a main body.

FIG. 9 is a view illustrating one embodiment related to the arrangement of a power button and an input button included in an operating part.

FIG. 10 is a flowchart illustrating a flow of a control method performed by the cleaner according to the embodiment of the present disclosure.

FIG. 11 is a flowchart for explaining in detail a control method of a cleaning nozzle detection type step in the control method in FIG. 10.

FIG. 12 is a flowchart for explaining in detail a control method in a case in which the cleaning nozzle is a wet mop rag nozzle in the control method in FIG. 10.

FIG. 13 is a flowchart for explaining in detail a control method in a case in which the cleaning nozzle is a suction nozzle in the control method in FIG. 10.

MODE FOR INVENTION

Hereinafter, exemplary embodiments of the present disclosure will be described in detail with reference to the accompanying drawings.

The present disclosure may be variously modified and may have various embodiments, and particular embodiments illustrated in the drawings will be specifically described below. The description of the embodiments is not intended to limit the present disclosure to the particular embodiments, but it should be interpreted that the present disclosure is to cover all modifications, equivalents and alternatives falling within the spirit and technical scope of the present disclosure.

The terminology used herein is used for the purpose of describing particular embodiments only and is not intended to limit the present disclosure. Singular expressions may include plural expressions unless clearly described as different meanings in the context.

Unless otherwise defined, all terms used herein, including technical or scientific terms, may have the same meaning as commonly understood by those skilled in the art to which the present disclosure pertains. The terms such as those defined in a commonly used dictionary may be interpreted as having meanings consistent with meanings in the context of related technologies and may not be interpreted as ideal or excessively formal meanings unless explicitly defined in the present application.

FIG. 1 is a perspective view of a cleaner according to an embodiment of the present disclosure, FIG. 2 is a perspective view of a wet mop rag nozzle provided to be connected to the cleaner according to the embodiment of the present disclosure, FIG. 3 is a front view of the wet mop rag nozzle in FIG. 2, FIG. 4 is a top plan view of the wet mop rag nozzle in FIG. 2, FIG. 5 is an exploded perspective view of the wet mop rag nozzle in FIG. 2, and FIG. 6 is an interior view of the wet mop rag nozzle in FIG. 2 when viewed from above.

A cleaner and a mechanical structure of a cleaning nozzle capable of being connected to a main body of the cleaner according to an embodiment of the present disclosure will be described with reference to FIGS. 1 to 6.

A cleaner 10 may include a main body 100, cleaning nozzles 200 and 300, and an extension tube 400.

Hereinafter, first, the main body 100 of the cleaner 10 will be described.

The main body 100 may include a main body housing 110, a suction part 120, a dust separating part 130, a suction motor 140, a handle 150, and an operating part 160.

The main body housing 110 may define an external appearance of the main body 100. The main body housing 110 may provide a space that may accommodate the suction motor 140 and a filter (not illustrated) therein. The main body housing 110 may be formed in a shape similar to a cylindrical shape.

The suction part 120 may protrude outward from the main body housing 110. For example, the suction part 120 may be formed in a cylindrical shape with an opened inside. The suction part 120 may be coupled to the extension tube 400 or the cleaning nozzles 200 and 300. The suction part 120 may provide a flow path (hereinafter, referred to as a 'suction flow path') through which air containing dust may flow.

The dust separating part 130 may communicate with the suction part 120. The dust separating part 130 may separate dust sucked into the dust separating part 130 through the suction part 120. A space in the dust separating part 130 may communicate with a space in a dust bin 180.

For example, the dust separating part 130 may have two or more cyclone parts capable of separating dust using a cyclone flow. Further, the space in the dust separating part 130 may communicate with the suction flow path. Therefore, air and dust, which are sucked through the suction part 120, spirally flow along an inner circumferential surface of the dust separating part 130. Therefore, the cyclone flow may be generated in an internal space of the dust separating part 130.

The dust separating part 130 communicates with the suction part 120. The dust separating part 130 adopts a principle of a dust collector using a centrifugal force to separate the dust sucked into the main body 100 through the suction part 120.

For example, the dust separating part 130 may include at least one cyclone part capable of separating dust by using a cyclone flow. The cyclone part may communicate with the suction part 120. The air and dust introduced through the suction part 120 spirally flows along an inner peripheral surface of the cyclone part.

The dust separating part 130 may further include a secondary cyclone part configured to separate again dust from the air discharged from the cyclone part. In this case, the secondary cyclone part may be positioned in the cyclone part to minimize a size of the dust separating part 130. The secondary cyclone part may include a plurality of cyclone bodies disposed in parallel. The air discharged from the cyclone part may be distributed to and pass through the plurality of cyclone bodies.

The dust separating part 130 may further include a cyclone filter (not illustrated) disposed to surround the secondary cyclone part. The cyclone filter may include a mesh portion made of a metallic material and having a plurality of holes to filter out dust during a process in which air passes through the cyclone filter.

The suction motor 140 may generate a suction force for sucking air containing dust. The suction motor 140 may be accommodated in the main body housing 110. The suction motor 140 may generate a suction force by rotating and introduce air into the dust bin 180. For example, the suction motor 140 may be formed in a shape similar to a cylindrical shape.

The handle 150 may be gripped by the user. The handle 150 may be disposed rearward of the suction motor 140. For example, the handle 150 may be formed in a shape similar to a cylindrical shape. Alternatively, the handle 150 may be formed in a curved cylindrical shape. The handle 150 may be disposed at a predetermined angle with respect to the main body housing 110, the suction motor 140, or the dust separating part 130.

The operating part 160 may be disposed on the handle 150. The operating part 160 may be disposed on an inclined surface formed in an upper region of the handle 150. The user may input a command for operating or stopping the cleaner 10 through the operating part 160.

The operating part 160 may include a power button 161 and one or more input buttons 162 and 163. In case that the suction nozzle 200 is connected to the main body 100, the input buttons 162 and 163 may be related to control of an increase/decrease in suction force of the suction motor 140. In case that the wet mop rag nozzle 300 is connected to the main body 100, the input buttons 162 and 163 may be related to control of an increase/decrease in rotational speed of a wet mop rag 361 and fluid spray control. An embodiment in which all plurality of above-mentioned control processes may be performed only by a limited minimum number of input buttons will be described below with reference to FIG. 8 and the subsequent drawings.

The main body 100 may include the dust bin 180. The dust bin 180 may communicate with the dust separating part 130. The dust bin 180 may store the dust separated by the dust separating part 130.

A discharge cover may be provided at a lower side of the dust bin 180 to open or close one end of the dust bin 180 based on the longitudinal direction. Specifically, the discharge cover may be rotatably coupled to one open side of the dust bin 180 and selectively open or close the lower side of the dust bin 180.

The main body 100 may include a battery housing 170. A battery 175 may be accommodated in the battery housing 170. The battery housing 170 may be disposed below the handle 150. For example, the battery housing 170 may have a hexahedral shape opened at a lower side thereof. A rear side of the battery housing 170 may be connected to the handle 150.

The battery housing 170 may include an accommodation portion opened downward. The battery 175 may be attached or detached through the accommodation portion of the battery housing 170.

Meanwhile, the main body 100 may include the battery 175. The battery 175 may be separably coupled to the main body 100. The battery 175 may be separably coupled to the battery housing 170. For example, the battery 175 may be inserted into the battery housing 170 from the lower side of the battery housing 170.

The battery 175 is configured to supply power. For example, the battery 175 may supply power to the suction motor 140. For example, the battery 175 may supply power to the cleaning nozzles 200 and 300. The battery 175 may be disposed below the handle 150. The battery 175 may be disposed rearward of the dust bin 180.

Hereinafter, the extension tube 400 will be described. The cleaning nozzles 200 and 300 will be described in detail after the description of the extension tube 400.

The cleaner may include the extension tube 400. The extension tube 400 may communicate with the cleaning nozzles 200 and 300. The extension tube 400 may communicate with the main body 100. The extension tube 400 may communicate with the suction part 120 of the main body 100. The extension tube 400 may be formed in a long cylindrical shape.

The main body 100 may be connected to the extension tube 400. The main body 100 may be connected to the cleaning nozzles 200 and 300 through the extension tube 400.

In the embodiment in which the cleaning nozzle 200 or 300 connected to the main body 100 is the suction nozzle 200, the main body 100 may generate a suction force by means of the suction motor 140, and the suction force may be provided to the cleaning nozzle 200 through the extension tube 400. In this case, outside dust may be introduced into the main body 100 through the cleaning nozzle 200 and the extension tube 400.

Hereinafter, various cleaning nozzles 200 and 300 provided to be connected to the main body 100 will be described.

The cleaning nozzle connected to the main body 100 may be the suction nozzle 200.

The suction nozzle 200 described in the embodiment of the present disclosure may be a cleaning nozzle that serves to suck dust on a cleaning target surface by using the suction force of the suction motor 140 provided in the main body 100.

In this case, the dust is an inclusive term indicating foreign substances, for example, hair, lint, fine powder, plastic pieces, small insect carcasses, and the like adhering to the cleaning target surface. The dust may include anything from fine dust invisible to the eye to dust that is visible and has some weight to some extent. That is, the dust may indicate all the materials that may be introduced into the dust bin 180 of the main body 100 by the suction force of the suction motor 140.

The suction nozzle 200 may be separably connected to the main body 100. The suction nozzle 200 may be connected directly to the main body 100 or connected indirectly to the main body 100 through the extension tube 400.

With reference to FIG. 1, the suction nozzle 200 may include a nozzle body 210, a rotary cleaning part 220, and a nozzle drive part 230.

The nozzle body 210 may include an accommodation body 213 configured to define an external shape of the suction nozzle 200 and accommodate the rotary cleaning part 220 and the nozzle drive part 230 therein, and a connection tube 215 connected to the main body 100 or the extension tube 400.

The nozzle body 210 may have a front opening 210*a* for sucking air containing contaminants.

In this case, air may be introduced through the front opening 210*a* by the suction force generated by the suction motor 140 of the main body 100. The introduced air may be moved to the connection tube 215 through the rotary cleaning part 220. The air may be discharged to the outside of the cleaner 10 after the dust is separated in the dust bin 180 of the main body 100.

The rotary cleaning part 220 may be accommodated in the accommodation body 213, and the rotary cleaning part 220 may suck air and transmit the air to the suction part 120 while rotating.

The nozzle drive part 230 may be configured to rotate the rotary cleaning part 220. The nozzle drive part 230 may be inserted into one side of the rotary cleaning part 220 and transmit power to the rotary cleaning part 220. However, this is an example of transmitting power. The nozzle drive part 230 may be positioned in a separate space defined in a direction of the connection tube 215 without being inserted into one side of the rotary cleaning part 220, and the nozzle drive part 230 may be positioned in parallel with the rotary cleaning part 220 in a forward/rearward direction.

The nozzle drive part 230 may include a nozzle motor (not illustrated) for generating driving power.

The nozzle drive part 230 may further include a power transmission part (not illustrated) for transmitting power of the nozzle motor to the rotary cleaning part 220. An example of the power transmission part may have a gear. Alternatively, any structure capable of transmitting power may be applied. For example, the power transmission part may include pulleys and a belt configured to connect the pulleys.

The power transmission part may transmit rotational power generated by the nozzle motor to the rotary cleaning part 220 while appropriately reducing a rotational speed per minute of the nozzle motor by using a gear ratio or a difference in radii between the pulleys. That is, a reduction ratio of the nozzle motor is determined depending on a ratio between the gears provided in the power transmission part, and thus the rotational speed per minute of the rotary cleaning part 220 is determined. This is to transmit the optimized rotational speed per minute and rotational torque that vary depending on the cleaning target surfaces.

For example, a fluffy nozzle for general purposes and a carpet nozzle for cleaning a carpet may use the same type of nozzle motor with the same size. However, the reduction ratio of the carpet nozzle may be smaller than a reduction ratio of the fluffy nozzle, such that a rotational speed per minute of the rotary cleaning part 220 may be high. This eventually means that the current required for the operation is high.

The rotary cleaning part 220 may rub against the cleaning target surface while being rotated by the driving power transmitted through the nozzle drive part 230, thereby removing contaminants. In addition, an outer peripheral surface of the rotary cleaning part 220 may be made of a woven fabric or felt material such as a woven fabric. Therefore, when the rotary cleaning part 220 rotates, foreign substances such as dust accumulating on the cleaning target surface may be effectively removed by being trapped on the outer peripheral surface of the rotary cleaning part 220.

Because the suction nozzles 200 have different features depending on the reduction ratios as described above, various types of suction nozzles 200 capable of being used for different purposes may be implemented.

For example, the suction nozzle 200, which includes the power transmission part that allows the nozzle motor, which has a high rotational speed per minute, to have an appropriate reduction ratio, may have a relatively small reduction ratio, e.g., 3.3:1 and be used as the carpet nozzle. In addition, the suction nozzle 200 may have a relatively large reduction ratio, e.g., 13.5:1 and be used for the fluffy nozzle for the general purpose. The suction nozzle 200, in which a rotational speed per minute of the nozzle motor is low and a reaction force received from the cleaning target surface is low, may be used as the bedding nozzle.

Meanwhile, in the embodiment of the present disclosure, whether any one of the suction nozzles 200 having various applications is coupled to the main body 100 and whether the wet mop rag nozzle 300, instead of the suction nozzle 200, is coupled to the main body 100 may be distinguished by using a load current measurement value pattern during an initial operation. This configuration will be described below with reference to FIG. 7.

The cleaning nozzle connected to the cleaner 10 may be the wet mop rag nozzle 300.

The wet mop rag nozzle 300 described in the embodiment of the present disclosure may be a cleaning nozzle configured to serve to clean the cleaning target surface by rubbing the cleaning target surface with the wet mop rag without a suction function.

The wet mop rag nozzle 300 may be separably connected to the main body 100. The wet mop rag nozzle 300 may be connected directly to the main body 100 or connected indirectly to the main body 100 through the extension tube 400.

Axes of the wet mop rag nozzle 300 are defined with reference to FIG. 6.

A central axis A1 of the wet mop rag nozzle 300 is an axis that divides the wet mop rag nozzle 300 into left and right sides. The central axis A1 of the wet mop rag nozzle 300 extends forward and rearward. The central axis A1 of the wet mop rag nozzle 300 is consistent with the longitudinal direction of the extension tube 400.

A wet mop rag axis A2 is a line that connects rotation centers of the plurality of wet mop rags 361, and the rotation centers of the wet mop rags 361 are disposed along the wet mop rag axis A2. The wet mop rag axis A2 is disposed in one direction. For example, the wet mop rag axis A2 may be disposed in a leftward/rightward direction. In this case, the wet mop rag axis A2 may be orthogonal to the central axis A1 of the wet mop rag nozzle 300.

With reference to FIGS. 2 to 6, the wet mop rag nozzle 300 may include a wet mop rag nozzle housing 310 and a connection tube 380.

The wet mop rag nozzle housing 310 is configured to define an external shape of the wet mop rag nozzle 300 and define a space in which other constituent elements may be accommodated.

The wet mop rag nozzle housing 310 may be connected to the main body 100. The wet mop rag nozzle housing 310 may be connected indirectly to the main body 100 through the extension tube 400. Alternatively, the wet mop rag nozzle housing 310 may be connected directly to the main body 100.

The connection tube 380 is disposed at a rear end of the wet mop rag nozzle housing 310. The connection tube 380 is fastened to the extension tube 400 or the main body 100, such that the wet mop rag nozzle housing 310 may be connected to the extension tube 400 or the main body 100.

The term 'connection' repeatedly disclosed in the present specification may be interpreted in various ways. For example, the term 'connection' may mean mechanical coupling. For example, the term 'connection' may mean electrical coupling. The current may flow from the battery 175 disposed in the main body 100 to the wet mop rag nozzle 300 by the electrical coupling.

The wet mop rag nozzle housing 310 may be divided into a lower housing 311 and an upper housing 312 (see FIGS. 3 and 5).

The lower housing 311 defines a lower surface and a lateral surface of the wet mop rag nozzle 300.

One side of a bottom surface of the lower housing 311 is formed as a groove recessed upward so that the wet mop rag 361 is disposed. A plurality of components for operating the wet mop rag nozzle 300 may be installed on the upper surface of the lower housing 311.

The upper housing 312 defines the upper surface and a part of the lateral surface of the wet mop rag nozzle 300. The upper housing 312 may be coupled to the lower housing 311, and a water container 320 may be installed on the upper surface of the upper housing 312.

A release button 3123 may be disposed on the upper housing 312. The release button 3123 may fix the water container 320 to the upper housing 312. When the release button 3123 operates, the water container 320 may be detached from the upper housing 312.

Hereinafter, a configuration related to a fluid spray of the wet mop rag nozzle will be described in detail.

The wet mop rag nozzle 300 may include the water container 320.

The water container 320 may supply a fluid to a spray nozzle 344.

With reference to FIGS. 2 and 5, the water container 320 may be disposed on an upper portion of the wet mop rag nozzle housing 310 and configured to store the fluid. The water container 320 may have a water supply port 321 formed in the upper surface of the water container 320 so that the fluid is introduced.

In this case, the fluid may be fresh water. Alternatively, the fluid may be a liquid detergent.

The water container 320 may be disposed on the wet mop rag nozzle housing 310. Specifically, the water container 320 may be mounted on the upper housing 312. The upper housing 312 may have a groove recessed downward in the upper surface of the upper housing 312 so that the water container 320 is seated. At least part of the water container 320 may be inserted and seated into the groove of the upper housing 312.

The water container 320 may be disposed above a wet mop rag motor 362. Specifically, the water container 320 may be disposed above the wet mop rag motor 362 and spaced apart from the wet mop rag motor 362.

Because the water container 320 is disposed to be spaced apart from the wet mop rag motor 362, vibration of the wet mop rag motor 362 is not transmitted. In addition, the fluid is stored in the water container 320. Even though vibration of the wet mop rag motor 362 is transmitted to the water container 320, the vibration of the wet mop rag motor 362 is absorbed by the fluid, such that the wet mop rag nozzle 300 is not vibrated.

The water container 320 may include the water supply port 321. The water supply port 321 is a hole through which the fluid is introduced into the water container 320. The water supply port 321 may be formed in the upper surface of the water container 320.

In case that the water container 320 is mounted on the wet mop rag nozzle housing 310, the water supply port 321 may be exposed to the outside. Therefore, the water container 320 may supply water without being separated during the cleaning process.

The water container 320 may include a water supply port cap 322. The water supply port cap 322 may cover the water supply port 321 and block a leak of the fluid.

The water supply port cap 322 may be made of a material having flexibility. For example, the water supply port cap 322 may be made of a rubber material. The water supply port cap 322 may be separated from the water container 320 while the water is supplied. The water supply port cap 322 may be coupled to the water container 320 again when the supply of water ends.

The wet mop rag nozzle 300 may include a fluid spray part 340.

The fluid spray part 340 includes a water pump 341. The water pump 341 operates to spray the fluid accommodated in the water container 320 to the outside of the wet mop rag nozzle 300.

The fluid spray part 340 may further include a tank hose 342, a nozzle hose 343, and the spray nozzle 344.

The fluid spray part 340 may further include a water container connection part 345.

The water container connection part 345 may be coupled to the upper housing 312 and operate a valve (not illustrated) in the water container 320, such that the fluid may flow.

More specifically, the water container connection part 345 may be coupled to the lower side of the upper housing 312. A part of the water container connection part 345 may penetrate the upper housing 312 and protrude upward. When the water container 320 is seated on the upper housing 312, the water container connection part 345, which protrudes upward, may penetrate a drain port of the water container 320 and be introduced into the water container 320.

In this case, the drain port means a hole through which the fluid stored in the water container 320 is discharged. The fluid discharged from the drain port flows to the spray nozzle 344. The drain port is formed in a lower surface of the water container 320. Specifically, the drain port may be formed at a left lower end of the water container 320.

The water pump 341 may allow the fluid stored in the water container 320 to flow.

With reference to FIG. 6, the water pump 341 may be disposed in the wet mop rag nozzle housing 310 and disposed at one side based on the central axis A1 of the wet mop rag nozzle 300. The water pump 341 may be disposed at the left side based on the central axis A1 of the wet mop rag nozzle 300.

The water pump 341 is disposed between the water container 320 and the spray nozzle 344 and pumps the fluid stored in the water container 320 to the spray nozzle 344.

One end of the tank hose 342 is connected to the water container connection part 345, and the other end of the tank hose 342 is connected to an inlet end of the water pump 341.

The water pump 341 is connected to the drain port of the water container 320 and allows the fluid stored in the water container 320 to flow by using negative pressure. The spray nozzle 344 is connected to a downstream side of the water pump 341, and the fluid is pumped to the spray nozzle 344 and sprayed to the outside of the wet mop rag nozzle 300.

One end of the nozzle hose 343 is connected to an outlet end of the water pump 341, and the other end of the nozzle hose 343 is connected to the spray nozzle 344.

The spray nozzle 344 is configured to spray the fluid. The spray nozzle 344 may be disposed in the wet mop rag nozzle housing 310 and disposed on the central axis A1 of the wet mop rag nozzle 300. The spray nozzle 344 may be supplied with the fluid from the water container 320 and spray the fluid to the front side of the wet mop rag 361.

The spray nozzle 344 may be disposed on a front surface of the wet mop rag nozzle housing 310. When the spray nozzle 344 sprays the fluid to the front side of the wet mop rag nozzle housing 310, the wet mop rag 361 may absorb the fluid and perform the cleaning process when the wet mop rag nozzle 300 moves forward.

In the embodiment in which the spray nozzle 344 is disposed on the central axis A1 of the wet mop rag nozzle 300, the fluid is sprayed between a left wet mop rag 361*a* and a right wet mop rag 361*b*. Therefore, when the wet mop rag nozzle 300 moves forward, the fluid may be equally absorbed by the left wet mop rag 361*a* and the right wet mop rag 361*b*.

The wet mop rag nozzle 300 may include an LED emission part 350.

The LED emission part 350 is configured to emit light toward the front side of the wet mop rag nozzle 300 based on the movement direction. The LED emission part 350 allows the user to easily identify foreign substances present at the front side of the wet mop rag nozzle 300 during the cleaning process.

The LED emission part 350 may include a light emitting diode (LED) that is a light-emitting member.

With reference to FIG. 5, LEDs 351 may include a left LED 351*a* and a right LED 351*b*. The LED 351 may be disposed in the wet mop rag nozzle housing 310 and disposed to emit light toward the front side of the wet mop rag nozzle housing 310.

More specifically, the left LED 351*a* and the right LED 351*b* may be disposed on the front surface of the wet mop rag nozzle housing 310 and emit light toward the front side of the wet mop rag nozzle housing 310. Therefore, the user may easily identify dust present at the front side of the wet mop rag nozzle 300. In addition, the user may identify the presence of the sprayed fluid and manipulate the wet mop rag 361 so that the wet mop rag 361 may easily absorb the fluid.

The LED 351 may be disposed outside the spray nozzle 344 based on the central axis A1 of the wet mop rag nozzle 300. Therefore, because the user may identify the position of the sprayed fluid, the user may manipulate to adjust an injection angle of the spray nozzle 344 in case that the fluid is sprayed to be biased toward the left or right side.

Meanwhile, the spray nozzle 344 may be disposed between the left LED 351*a* and the right LED 351*b*. With this arrangement, the LED 351 may allow the user to identify the presence of the sprayed fluid, and the fluid may be more easily absorbed by the left wet mop rag 361*a* and the right wet mop rag 361*b*.

In this case, a diffusion plate, which transmits light, may be disposed forward of the LED 351. The spray nozzle 344 may be formed on the diffusion plate.

The wet mop rag nozzle 300 may include a wet mop rag rotation part 360.

The wet mop rag rotation part 360 is configured to allow the wet mop rag 361 to wipe and clean the cleaning target surface. The wet mop rag rotation part 360 is supplied with the fluid from the water container 320 and cleans the cleaning target surface in a wet manner by using friction.

The wet mop rag rotation part 360 may include the wet mop rag 361.

With reference to FIG. 2, the wet mop rag 361 may be provided as a plurality of wet mop rags 361 disposed at the lower end of the wet mop rag nozzle housing 310. Specifically, the wet mop rags 361 may be respectively disposed at a left lower end and a right lower end based on the central axis A1 of the wet mop rag nozzle 300. Specifically, the left wet mop rag 361*a* may be disposed at the left lower end based on the central axis A1 of the wet mop rag nozzle 300, and the right wet mop rag 361*b* may be disposed at the right lower end based on the central axis A1 of the wet mop rag nozzle 300.

The wet mop rag 361 has a rotary shaft disposed upward and downward, such that the wet mop rag 361 may rub and clean the cleaning target surface while rotating about the rotary shaft. The rotary shaft of the wet mop rag 361 may be disposed along the wet mop rag axis A2.

The left wet mop rag 361*a* and the right wet mop rag 361*b* may rotate in different directions. For example, with reference to FIG. 4, the left wet mop rag 361*a* may rotate clockwise CW, and the right wet mop rag 361*b* may rotate counterclockwise CCW. Therefore, by a frictional force, the pair of wet mop rags 361 may push the cleaning target surface rearward, and the wet mop rag nozzle 300 may be easily moved relatively forward, such that the user may more easily move the cleaner forward.

The wet mop rag rotation part 360 may further include a wet mop rag plate 367. The wet mop rag plate 367 is configured to support the wet mop rag 361.

With reference to FIG. 5, the wet mop rag plate 367 is coupled to the lower surface of the wet mop rag nozzle housing 310. An upper surface of the wet mop rag plate 367 is mechanically connected to a spur gear 366 (see FIG. 6), and the wet mop rag 361 is fixed to a lower surface of the wet mop rag plate 367. Therefore, the wet mop rag plate 367 rotates by receiving power through the spur gear 366. When the wet mop rag plate 367 rotates, the wet mop rag 361 rotates simultaneously.

The wet mop rag plate 367 may be formed in a circular plate shape similar to a shape of the wet mop rag 361. The wet mop rag plates 367 may include a left wet mop rag plate 367*a* disposed at the left side based on the central axis A1 of the wet mop rag nozzle 300, and a right wet mop rag plate 367*b* disposed at the right side based on the central axis A1 of the wet mop rag nozzle 300.

With reference to FIGS. 5 and 6, the wet mop rag rotation part 360 may include the wet mop rag motor 362. The wet mop rag motor 362 is configured to supply power to the wet mop rag 361.

The wet mop rag motor 362 may be disposed in the wet mop rag nozzle housing 310 and have a shaft 363 disposed along a wet mop rag motor shaft A3. The wet mop rag motor shaft A3 may be positioned to be inconsistent with the wet mop rag axis A2. With reference to FIG. 6, in the possible embodiment, when the wet mop rag axis A2 extends in a leftward/rightward direction, the wet mop rag motor shaft A3 may extend in a direction inclined from a left front side to a right rear side.

In the possible embodiment, the wet mop rag motor 362 may be a bi-axial motor. Unlike the single-axial motor having the shaft 363 protruding toward one side of the motor, the bi-axial motor has the shafts 363 protruding toward the two opposite sides of the motor. For example, as illustrated in FIG. 6, the shafts 363 of the bi-axial motor protrude toward the left and right sides of the motor.

Therefore, the components may be positioned at the optimized positions, which may reduce the size of the wet mop rag nozzle 300.

In general, the wet mop rag 361 needs to be disposed at a center of the wet mop rag nozzle housing 310. As illustrated in FIG. 6, the positions of the spur gears 366 are restricted. If the wet mop rag motor 362 is disposed between a left spur gear 366*a* and a right spur gear 366*b* and the wet mop rag motor shaft A3 and the wet mop rag axis A2 are disposed coaxially, there is a problem in that a left/right width of the wet mop rag nozzle 300 are increased. In case that the wet mop rag motor 362 is disposed forward of the spur gear 366, the left/right width of the wet mop rag nozzle 300 is advantageously decreased. However, because a center of gravity of the wet mop rag nozzle 300 is biased forward, there is a problem in that the wet mop rag 361 is not uniformly tightly attached to a cleaning region, and it is inconvenient to manipulate the cleaner.

In contrast, according to the above-mentioned embodiment, even though the wet mop rag motor 362 is disposed between the left spur gear 366*a* and the right spur gear 366*b*, the left/right width of the wet mop rag nozzle 300 is not increased. In addition, because the center of gravity is not biased toward the front side of the wet mop rag nozzle 300, the wet mop rag 361 may be uniformly tightly attached to the cleaning region.

Continuously, power transmission components included in the wet mop rag rotation part 360 will be described below in detail.

The shaft 363 of the wet mop rag motor 362 protruding leftward transmits power to the left wet mop rag 361*a*, and the shaft 363 of the wet mop rag motor 362 protruding rightward transmits power to the right wet mop rag 361*b*.

The shaft 363 rotates in one direction. The shaft 363 may rotate counterclockwise when the wet mop rag motor 362 is viewed rightward. The shaft 363 may rotate clockwise when the wet mop rag motor 362 is viewed leftward.

The shafts 363 may be separately provided as a left shaft 363*a* and a right shaft 363*b* or integrated. Even in case that the left shaft 363*a* and the right shaft 363*b* are provided separately, the left shaft 363*a* and the right shaft 363*b* rotate in the same direction.

The wet mop rag rotation part 360 may further include worm gears 364, worm wheel gears 365, and the spur gears 366.

The worm gear 364 is coupled to the shaft 363. The worm gear 364 is formed in a cylindrical shape and has a screw thread formed on an outer peripheral surface thereof. The worm gear 364 is coupled to the shaft 363 and rotates simultaneously with the shaft 363.

Alternatively, the worm gear 364 may be integrated with the shaft 363 by forming a screw thread on the outer peripheral surface of the shaft 363.

The worm wheel gear 365 is connected to the worm gear 364 and transmits power to the wet mop rag 361. The worm wheel gear 365 is mechanically connected to the worm gear 364. Specifically, the worm wheel gear 365 engages with the worm gear 364.

The worm wheel gear 365 changes a rotation axis extending in a lateral direction (a horizontal direction) to a rotation axis extending in the upward/downward direction, thereby easily transmitting power to the wet mop rag 361. In addition, the worm gear 364 appropriately adjusts the rotational speed of the wet mop rag 361 by changing a high rotational speed to a low rotational speed.

The worm gears 364 are divided into a left worm gear 364*a* and a right worm gear 365*b*.

The left worm gear 364*a* transmits power to the left wet mop rag 361*a* disposed at the left side of the wet mop rag motor 362. The right worm gear 364*b* transmits power to the right wet mop rag 361*b* disposed at the right side of the wet mop rag motor 362.

The left worm gear 364*a* is coupled to the left shaft 363*a*. The right worm gear 364*b* is coupled to the right shaft 363*b*.

The screw thread of the left worm gear 364*a* and the screw thread of the right worm gear 364*b* are formed in the same direction. In other words, the left worm gear 364*a* and the right worm gear 364*b* are formed in the same shape. With this shape, one integrated worm gear 364 may be manufactured and assembled as the left worm gear 364*a* and the right worm gear 364*b*, as necessary, such that manufacturing costs are reduced, and the maintenance is conveniently performed. However, the wet mop rag nozzle in the related art, the screw thread of the left worm gear and the screw thread of the right worm gear need to be designed in opposite directions so that the rotation direction of the left wet mop rag and the rotation direction of the right wet mop rag are opposite to each other, which may cause a problem in that the left worm gear and the right worm gear need to be manufactured separately.

The worm wheel gears 365 are divided into a left worm wheel gear 365*a* and a right worm wheel gear 365*b*.

The left worm wheel gear 365*a* transmits power to the left wet mop rag 361*a* disposed at the left side of the wet mop rag motor 362. The right worm wheel gear 365*b* transmits power to the right wet mop rag 361 disposed at the right side of the wet mop rag motor 362.

The left worm wheel gear 365*a* is connected to the left worm gear 364*a*. The right worm wheel gear 365*b* is connected to the right worm gear 364*b*.

The left worm wheel gear 365*a* and the right worm wheel gear 365*b* may be formed in the same shape. With this shape, one integrated worm wheel gear 365 may be manufactured and assembled as the left worm wheel gear 365*a* and the right worm wheel gear 365*b*, as necessary, such that manufacturing costs are reduced. Alternatively, in the wet mop rag nozzle in the related art, a configuration for changing the rotation direction needs to be added to any one of the left worm wheel gear and the right worm wheel gear so that the rotation direction of the left spur gear and the rotation direction of the right spur gear are opposite to each other, which may cause a problem in that the left worm wheel gear and the right worm wheel gear need to be separately manufactured.

The left worm wheel gear 365*a* is disposed at one side of the wet mop rag motor shaft A3, and the right worm wheel gear 365*b* is disposed at the other side of the wet mop rag motor shaft A3. Specifically, with reference to FIG. 6, the left worm wheel gear 365*a* is disposed rearward of the wet mop rag motor shaft A3, and the right worm wheel gear 365*b* is disposed forward of the wet mop rag motor shaft A3. With this arrangement, even though the left worm gear 364*a* and the right worm gear 364*b* are manufactured as the same component and the left worm wheel gear 365*a* and the right worm wheel gear 365*b* are manufactured as the same component, the rotation direction of the left worm wheel gear 365*a* and the rotation direction of the right worm wheel gear 365*b* may be opposite to each other. Therefore, even in case that the left component and the right component are identical to each other, the rotation direction of the wet mop rag 361 may be changed only by changing the arrangement of the component.

The spur gear 366 is disposed along the wet mop rag axis A2 and connected to the worm wheel gear 365, and the rotation center of the spur gear 366 is connected to the rotation center of the wet mop rag 361. The spur gear 366 may receive power from the worm wheel gear 365 and transmit the power to the wet mop rag plate 367.

The rotation center of the spur gear 366 may be disposed concentrically with the rotation center of the wet mop rag 361. The rotation center of the spur gear 366 may be disposed on the wet mop rag axis A2.

The spur gear 366 may be coupled to the wet mop rag plate 367 and rotate integrally with the wet mop rag plate 367. The left spur gear 366*a* and the right spur gear 366*b* are formed in the same shape. In other words, one spur gear 366 may be manufactured and disposed as the left spur gear 366*a* or the right spur gear 366*b*, as necessary.

The wet mop rag nozzle 300 may include an illuminance sensor 370.

The illuminance sensor 370 may be configured to measure illuminance. The illuminance sensor 370 may measure illuminance outside the cleaner 10.

With reference to FIG. 2, the illuminance sensor 370 may be disposed on the wet mop rag nozzle housing 310 and disposed on the central axis A1 of the wet mop rag nozzle 300.

The illuminance sensor 370 may be disposed above the spray nozzle 344. Therefore, the spray nozzle 344 may not be affected by fluid fog sprayed from the spray nozzle 344.

The wet mop rag nozzle 300 may include a nozzle PCB 390.

The nozzle PCB 390 may be equipped with a nozzle control unit 395 configured to control the wet mop rag nozzle 300.

With reference to FIGS. 5 and 6, the nozzle PCB 390 may be disposed in the wet mop rag nozzle housing 310 and disposed at the other side based on the central axis A1 of the wet mop rag nozzle 300.

The nozzle PCB 390 may be electrically connected to the main body 100, more specifically, to a main body PCB 190 provided on the main body 100.

With reference to FIG. 6, the water pump 341 may be disposed at one side based on the central axis A1 of the wet mop rag nozzle 300, and the nozzle PCB 390 may be disposed at the other side based on the central axis A1 of the wet mop rag nozzle 300. With this arrangement, a center of gravity of the entire wet mop rag nozzle 300 is disposed on the central axis A1 of the wet mop rag nozzle 300, which may improve operational characteristics of the cleaner 10. In addition, because the nozzle PCB 390 is spaced apart from the water pump 341 at a significant distance, the nozzle PCB 390 is not damaged by heat emitted from the water pump 341.

Hereinafter, an embodiment of the present disclosure related to operation control of the cleaning nozzle will be described.

FIG. 7 is a view illustrating an embodiment of a load current measurement value pattern in which a current value is indicated by a value (unit: bit) converted by an ADC with respect to time (unit: ms) sampled from an initial operation of the cleaner after the cleaning nozzle is mounted, FIG. 8 is a functional block diagram illustrating a case in which a wet mop rag module is connected to a main body, and FIG. 9 is a view illustrating one embodiment related to the arrangement of a power button and an input button included in an operating part.

With reference to FIG. 8, the main body PCB 190 is provided on the main body 100 of the cleaner 10.

A main body control unit 195 may be mounted on the main body PCB 190. The main body control unit 195 may control an operation of the suction motor 140. More specifically, the main body control unit 195 may perform control to increase or decrease the speed of the suction motor 140 (increase or decrease the suction force) by controlling the current to be applied to the suction motor 140.

The main body control unit 195 may control the operation of the cleaning nozzle. To this end, the main body control unit 195 may generate a control instruction and transmit the control instruction to the cleaning nozzle. In this case, the main body control unit 195 may generate the control instruction by converting a voltage provided from the battery 175 into a pulse width modulation (PWM) signal.

The main body control unit 195 may include a measurement part (not illustrated) configured to measure the current flowing through the cleaning nozzle. A value of the current may be measured by sampling the current flowing through the cleaning nozzle in a preset sampling cycle and performing the analog-to-digital conversion (ADC) on the current.

The operating part 160 is provided on the main body 100 of the cleaner 10.

With reference to FIG. 9, the operating part 160 may include the power button 161. When the user pushes the power button 161, the suction motor 140 begins to be rotated by the main body control unit 195, such that the cleaner 10 may initially operate.

The operating part 160 may include one or more input buttons 162 and 163. With reference to FIG. 9, the input buttons 162 and 163 may include a first input button 162 and a second input button 163.

The main body control unit 195 may control the operation of the suction motor 140 by receiving a user input for manipulating the input buttons 162 and 163. For example, when the user pushes the first input button 162 during the operation of the cleaner 10, a speed of the suction motor 140 may be increased by the main body control unit 195. For example, when the user pushes the second input button 163 during the operation of the cleaner 10, the speed of the suction motor 140 may be decreased by the main body control unit 195.

In this case, in order to assist the user in intuitively understanding the first input button 162 and the second input button 163, the first input button 162, which guides the increase in speed of the suction motor 140, may be a button indicated by the symbol '+', and the second input button 163, which guides the decrease in speed of the suction motor 140, may be a button indicated by the symbol '−'. However, this configuration is provided for illustrative purposes only. It is sufficient that the first input button 162 and the second input button 163 are distinguished by using different images, figures, or symbols.

The main body control unit 195 may receive the user input for manipulating the input buttons 162 and 163 and transmit the control instruction to the cleaning nozzle. The control instruction may be received by the nozzle control unit 395. The transmission of the control instruction between the main body control unit 195 and the nozzle control unit 395 may be performed through the power line.

The cleaning nozzle including the nozzle control unit 395 may be the wet mop rag nozzle 300. The wet mop rag nozzle 300 may include at least one operation part in which the operations related to the function of the cleaning nozzle is controlled by the nozzle control unit 395. In this case, the operation parts may include the fluid spray part 340, the wet mop rag rotation part 360, and the LED emission part 350.

Meanwhile, the main body control unit 195 and the nozzle control unit 395 may include any type of device capable of processing data, such as a processor. Here, the 'processor' may refer to a data processing device embedded in hardware and having, for example, a circuit physically structured to perform a function represented by codes or instructions included in a program.

The wet mop rag nozzle 300 and the suction nozzle 200 may be distinguished depending on whether the nozzle control unit 395 is included. The different types of suction nozzles 300 may be distinguished depending on the configuration in which the suction nozzles 300 have different reduction ratios.

Hereinafter, how the cleaner 10 according to the embodiment of the present disclosure distinguishes and detects the types of cleaning nozzles connected to the main body 100 will be described.

When the cleaning nozzle is coupled to the main body 100 and initially operates, the main body control unit 195 applies power, which is supplied from the battery 175, to the cleaning nozzle.

For example, a voltage of the power supplied from the battery 175 may be a DC voltage of 29 V. The main body control unit 195 may adjust a magnitude of the voltage by controlling the direct current voltage with the PWM method in order to apply a voltage (e.g., 22 V to 23 V) with an appropriate magnitude to the cleaning nozzle. As well known, the magnitude of the voltage may be adjusted by changing a duty ratio in a state in which a switching cycle (e.g., 15 kHz) is constant. As the percentage of on time in the switching cycle increases, the duty ratio increases and the magnitude of the voltage is adjusted significantly.

In this case, the main body control unit 195 may measure a load current applied to the cleaning nozzle to which the main body 100 is connected. The load current may be measured by measuring the voltage across the two opposite ends of a shunt resistor connected in series to the cleaning nozzle and converting the voltage into a current value using Ohm's law. As a result, it is possible to measure the current value shown during the initial operation of the cleaning nozzle.

In addition, the measured load current value may be subjected to the analog-digital conversion using an ADC converter (not illustrated) included in the main body control unit 195. More specifically, the load current value measured at a predetermined sampling time interval (or sampling cycle), e.g., a time interval of 10 ms may be converted and shown by ADC. This is referred to as ADC sampling (or ADC measurement). The corresponding current value may be converted to an ADC-converted value that is not in amperes, i.e., one value from 0 bits or more to 255 bits or less. Therefore, the current value may be converted into 0 bits when no current flows, and the current value may be converted into 255 bits when the current flows as an allowable maximum value (unit: amperes).

With reference to FIG. 7, the main body control unit 195 may detect the type of cleaning nozzle on the basis of the measurement value pattern of the load current.

In case that the cleaning nozzle is the bedding nozzle among the suction nozzles 200, the rotational speed per minute may be low because a reaction force received when the rotary cleaning part 220 rotates may be low. In addition, the load current is low accordingly. Therefore, the load current may be measured as a preset first reference value or less. The preset first reference value or less refers to a case in which a current value measured for a preset first detection time (or a value converted by ADC) is a preset first threshold value CP1 or less.

The preset first detection time means a time interval between a first-first detection time td1-1 and a first-second detection time td-2 during the initial operation of the cleaner 10. With reference to the load current measurement value of the bedding nozzle, the detection may be performed in a first detection region, which is a range of the first threshold value or less, for the first detection time. Therefore, it is possible to identify that the cleaning nozzle currently mounted on the main body 100 is the bedding nozzle.

In case that the cleaning nozzle is different from the bedding nozzle, a rotational speed per minute of the nozzle drive part 230 may be relatively high. Therefore, because a large amount of initial load current is required, the load current value exceeds the first threshold value for the first detection time. Eventually, the case in which the cleaning nozzle is the bedding nozzle and the case in which the cleaning nozzle is not the bedding nozzle may be distinguished from each other.

In particular, it can be ascertained that the carpet nozzle, which has the nozzle drive part 230 that rotates at a high speed, requires a relatively large amount of current for the first detection time.

As described above, the wet mop rag nozzle 300 requires the nozzle control unit 395 to control the operation part (specifically, control the water pump 341 and the wet mop rag motor 362). In general, the nozzle control unit 395 includes control components such as a microcomputer (a micom or a micro-process based controller). A high-capacity capacitor may be required to activate the microcomputer (micom) during the initial operation. Therefore, a time for charging the high-capacity capacitor is required during the initial operation. This eventually shows a distinctive pattern in which the load current measurement value approaches almost 0 for a particular time. This configuration may be used to distinguish the wet mop rag nozzle 300 from the other cleaning nozzles.

With reference to FIG. 7, in case that the measured load current value is measured as a preset second reference value or less, the cleaning nozzle including the nozzle control unit 395 may be determined as the wet mop rag nozzle 300. The preset second reference value or less refers to a case in which a current value measured for a preset second detection time (or a value converted by ADC) is a preset second threshold value CP2 or less.

The preset second detection time means a time interval between a second-first detection time td2-1 and a second-second detection time td-2 during the initial operation of the cleaner 10. In this case, the load current value approaches almost 0 while the high-capacity capacitor is charged to activate the nozzle control unit 395. Therefore, when the second threshold value or less is set to a second detection region for the second detection time, the wet mop rag nozzle 300 including the nozzle control unit 395 may be distinguished. The remaining cleaning nozzles may have a load current value that exceeds the second threshold value for the second detection time.

When the process of charging the high-capacity capacitor ends, the nozzle control unit 395 is activated, and a required amount of current is increased again, such that the load current measurement value excessively increases again. Thereafter, the steady state is reached, a constant current value according to the supplied voltage converges downward.

In case that the rotational speed per minute of the nozzle motor is a relatively high speed like the carpet nozzle and the fluffy nozzle in FIG. 7, a large amount of current is required during the initial operation of the cleaner 10. Thereafter, the load current measurement value gradually decreases. In this case, a difference in amount of decrease in current occurs between the load current measurement value patterns of the two cleaning nozzles. This is because there is a difference between the reduction ratios even though the rotational speed per minute of the nozzle drive part 230 or the rotational speed per minute of the nozzle motor is constant. Therefore, the carpet nozzle having a small reduction ratio requires a large amount of current during the initial operation because the operating speed of the rotary cleaning part 220 is relatively highest. Therefore, a relatively high current value is maintained for the nozzle detection time in comparison with the other cleaning nozzles.

If the measured current value is measured as a preset third reference value or more, the cleaning nozzle, which has the nozzle drive part 230 having the nozzle motor with a high rotational speed per minute and has the power transmission part with the small reduction ratio, may be the carpet nozzle. In this case, the preset third reference value or more refers to a case in which a load current value measured for a preset third detection time (or a value converted by ADC) is a preset third threshold value CP3 or more.

On the contrary, i.e., in case that the load current value measured for the third detection time is less than the third threshold value CP3, the cleaning nozzle may be determined as the fluffy nozzle with a large reduction ratio.

As a result, the fluffy nozzle and the carpet nozzle may be distinguished by using the third detection region.

Because the suction nozzles 200, such as the bedding nozzle, the carpet nozzle, and the fluffy nozzle, are just distinguished depending on the purposes thereof, the present disclosure is not limited to the cleaning nozzle used for the purpose.

That is, the bedding nozzle and the other cleaning nozzles may be distinguished based on the cleaning nozzle having a relatively lowest rotational speed per minute of the nozzle drive part 230. The wet mop rag nozzle 300 and the other cleaning nozzles may be distinguished depending on whether the nozzle control unit 395 is included. In addition, the carpet nozzle and the fluffy nozzle may be distinguished depending on the configuration in which the cleaning nozzles have different reduction ratios.

The cleaner 10 according to the embodiment of the present disclosure is characterized in that the types of control corresponding to the pushing of the input buttons 162 and 163 are different in accordance with the types of cleaning nozzles detected by the main body control unit 195.

In case that the cleaning nozzle is detected as the suction nozzle 200, the control target corresponding to the first input button 162 and the second input button 163 may be the suction motor 140. When the user selects and pushes the first input button 162 and the second input button 163 as described above, the main body control unit 195 may increase or decrease a speed of the suction motor 140 by controlling the magnitude of the current applied to the suction motor 140. Therefore, the suction force applied to the cleaning target surface by the suction nozzle 200 may vary. The increase or decrease in speed of the suction motor 200 may be performed by adjusting the rotational speed per minute of the suction motor.

Alternatively, in case that the cleaning nozzle is detected as the wet mop rag nozzle 300, the function of the first input button 162 and the function of the second input button 163 may be changed.

More specifically, in case that it is determined that the wet mop rag nozzle 300 is connected to the main body 100, the main body control unit 195 may generate the control instruction by converting the voltage, which is supplied from the battery 175, into the PWM signal. In this case, the control instruction means a control signal for designating a control target among one or more operation parts included in the cleaning nozzle (the wet mop rag nozzle 300).

The control instruction may be implemented to vary in switching frequency in accordance with the types of the input buttons 162 and 163 manipulated by the user. That is, PWM control signals having different switching frequencies may be applied to the nozzle control unit 395 of the wet mop rag nozzle 300 in accordance with the first input button 162 or the second input button 163.

More specifically, the main body control unit 195 may change the magnitude of the voltage supplied by the battery 175 by using the pulse width modulation (PWM) to provide the adjusted voltage to the nozzle control unit 395. The main body control unit 195 may identify whether the manipulated input button is the first input button 162 or the second input button 163 and differently change the switching frequencies while maintaining the adjusted magnitude of the voltage.

That is, in case that the first input button 162 is manipulated, the main body control unit 195 may generate the first control instruction having the first switching frequency and transmit the first control instruction to the nozzle control unit 395. In case that the second input button 163 is manipulated, the main body control unit 195 may generate the second control instruction having the second switching frequency and transmit the second control instruction to the nozzle control unit 395.

The first switching frequency and the second switching frequency may be frequencies with different values and have the same duty ratio so that the constant voltage is transmitted to the nozzle control unit 395. The transmission of the control instruction is, of course, performed through the power line.

With the above-mentioned configuration, the transmission of power for operating the cleaning nozzle may be performed through the power line, and simultaneously, the transmission of communication related to the control of the operation parts included in the cleaning nozzle may also be performed through the power line.

The nozzle control unit 395 may control the operation part matched with the received switching frequency among the plurality of operation parts included in the wet mop rag nozzle 300. The operation part matched with the first switching frequency may be the wet mop rag rotation part 360 that rotates at least one wet mop rag 361 by the operation of the wet mop rag motor 362. The operation part matched with the second switching frequency may be the fluid spray part 340 that sprays the fluid by the operation of the water pump 341. That is, the first control instruction may be the control instruction that designates the wet mop rag rotation part 360 to the control target for the nozzle control unit 395. The second control instruction may be the control instruction that designates the fluid spray part 340 to the control target of the nozzle control unit 395.

Meanwhile, when it is determined that the wet mop rag nozzle 300 is connected to the main body 100, the main body control unit 195 may perform control to stop the operation of the suction motor 140. This is to prevent the fluid, which is used during the cleaning process, from being sucked into the extension tube 400 by the suction force of the suction motor 140.

The nozzle control unit 395 measures a time interval between time points at which the voltage of the received control instruction is changed. For example, the nozzle control unit 395 may determine the pulse width of the received signal on the basis of the number of clock signals counted between the time points at which the voltage PWM signals of the received control instructions are changed. For example, the nozzle control unit 395 may be configured to determine the duty ratio of the received voltage PWM signal on the basis of the number of clock signals counted between the time points at which the received control instructions are changed. For example, the nozzle control unit 395 may measure the on-time from a rising edge time point of the pulse width and/or frequency value of the received control instruction to a falling edge, measure the off-time from the falling edge time point to the rising edge time point, or measure a cycle made of adding up the on-time and the off-time. Therefore, the nozzle control unit 395 may determine the switching frequency and/or the pulse width of the control instruction received by the nozzle control unit 395 on the basis of at least one of the measured on-time, the measured off-time, and the cycle made by adding up the on-time and the off-time.

When the first input button 162 is manipulated, the nozzle control unit 395 may determine that the control instruction is the first control instruction having the first switching frequency by measuring the cycle of the control instruction transmitted by the main body control unit 195 by the above-mentioned method.

In case that it is determined that the first control instruction is received, the nozzle control unit 395 may control the output magnitude of the wet mop rag motor 362 so that the rotational speed of the wet mop rag 361 changes. The control of the output magnitude of the wet mop rag motor 362 may be implemented by controlling the current to be applied to the coil of the wet mop rag motor 362.

The nozzle control unit 395 may control the wet mop rag motor 362 so that the current rotational speed is alternately increased and decreased each time the first control instruction on the basis of the manipulation of the first input button 162 is received. The wet mop rag motor 362 rotates at a preset reference speed during the initial operation, and the speed may be increased when the first input button 162 is manipulated. When the first input button 162 is manipulated again in the state in which the speed is increased, the speed may be decreased to the reference speed again.

To this end, the nozzle control unit 395 may calculate the current rotational speed of the wet mop rag motor 362. For example, the current rotational speed of the wet mop rag motor 362 may be calculated by measuring the current to be applied to the wet mop rag motor 362.

In case that the current rotational speed of the wet mop rag motor 362 and the reference speed are equal to each other in the state in which the first control instruction is received, the nozzle control unit 395 may increase the rotational speed of the wet mop rag motor 362. In case that the current rotational speed of the wet mop rag motor 362 is higher than the reference speed in the state in which the first control instruction is received, the nozzle control unit 395 may decrease the rotational speed of the wet mop rag motor 362.

This control configuration may control the increase or decrease in rotational speed of the wet mop rag 361 by using the single first input button 162.

When the second input button 163 is manipulated, the nozzle control unit 395 may determine that the control instruction is the second control instruction having the second switching frequency by measuring the cycle of the control instruction transmitted by the main body control unit 195.

In case that it is determined that the second control instruction is received, the nozzle control unit 395 may control the operation of the water pump 341 so that the fluid spray part 340 sprays the fluid forward in a traveling direction of the wet mop rag nozzle 300.

More specifically, the nozzle control unit 395 may perform control to operate the motor of the water pump 341 to spray the fluid. In this case, the amount of fluid to be sprayed may be preset to the nozzle control unit 395, and the nozzle control unit 395 may control the amount of fluid to be sprayed by adjusting the time for which the motor of the water pump 341 operates.

Meanwhile, among the operation parts of the wet mop rag nozzle 300, the LED emission part 350 may be controlled regardless of the input buttons 162 and 163 of the operating part 160.

The nozzle control unit 395 may control the brightness of the LED 351 included in the LED emission part 350 on the basis of illuminance of the periphery of the wet mop rag nozzle 300. More specifically, the nozzle control unit 395 may control the brightness of the LED 351 by changing the voltage, which is applied to the LED 351, to various duty ratios by PWM. As well known, the brightness of the LED 351 may increase as the duty ratio increases.

It is assumed that the main body control unit 195 directly controls the operation part of the cleaning nozzle, unlike the above-mentioned embodiment.

In case that there is a plurality of operation parts in the cleaning nozzle, like the wet mop rag nozzle 300, there is a problem in that the change in voltage to be supplied directly to the operation part by the main body control unit 195 affects the performance of the operation part instead of the current control target. For example, in case that the main body control unit 195 directly controls the rotational speed of the wet mop rag 361, the change in magnitude of the voltage to be applied may also change the magnitude of the voltage to be applied to the LED emission part 350 and the fluid spray part 340.

Alternatively, as in the present disclosure embodiment, in case that the main body 100 is configured to transmit the constant power to the cleaning nozzle and the nozzle control unit 395 is configured to directly control the operation part, the above-mentioned problem may not be caused only by the power line communication, and the performance of the control target may be maintained. That is, in case that the voltage to be applied to the operation part needs to be changed, the nozzle control unit 395 changes the voltage, but the main body control unit 195 does not need to change the voltage.

Meanwhile, the embodiment of the present disclosure may be implemented by updating the software of the main body control unit 195 and the nozzle control unit 395. In addition, the above-mentioned embodiment is not limited to the wet mop rag nozzle 300, but may be equally applied to the other cleaning nozzles having various operation parts to be controlled by the nozzle control unit by updating the software. In other words, the configuration may be expanded and implemented so that the operation parts of various cleaning nozzles are controlled by using the limited number of input buttons of the operating part 160.

Hereinafter, a flow of a control method performed by the cleaner according to the embodiment of the present disclosure will be described with reference to FIGS. 10 to 13.

FIG. 10 is a flowchart illustrating a flow of a control method performed by the cleaner according to the embodiment of the present disclosure, FIG. 11 is a flowchart for explaining in detail a control method of a cleaning nozzle detection type step in the control method in FIG. 10, FIG. 12 is a flowchart for explaining in detail a control method in a case in which the cleaning nozzle is a wet mop rag nozzle in the control method in FIG. 10, and FIG. 13 is a flowchart for explaining in detail a control method in a case in which the cleaning nozzle is a suction nozzle in the control method in FIG. 10.

With reference to FIG. 10, first, the main body control unit 195 detects the type of cleaning nozzle connected to the main body 100 (S100).

Step S100 will be described below more specifically with reference to FIG. 11.

When the user connects a particular cleaning nozzle to the main body 100 and pushes the power button 161, the main body control unit 195 operates the suction motor 140 (S110).

Thereafter, the main body control unit 195 changes power, which is supplied from the battery 175, to the PWM signal and applies the PWM signal to the cleaning nozzle connected to the main body 100 (S120).

The main body control unit 195 may adjust a magnitude of the voltage by controlling the battery voltage with the PWM method in order to apply a voltage (e.g., 22 V to 23 V) with an appropriate magnitude to the cleaning nozzle. As well known, the magnitude of the voltage to be applied to the cleaning nozzle may be adjusted by changing a duty ratio in a state in which a switching cycle (e.g., 15 kHz) is constant. As the percentage of on time in the switching cycle increases, the duty ratio increases and the magnitude of the voltage is adjusted significantly.

Next, the main body control unit 195 measures a load current applied to the cleaning nozzle (S130).

The main body control unit 195 measures the load current value of the cleaning nozzle in accordance with the voltage signal controlled by the PWM method and applied to the particular cleaning nozzle connected to the main body 100 among various types of suction nozzles 200 and the wet mop rag nozzle 300, at a predetermined sampling interval by using the ADC conversion.

Next, the main body control unit 195 analyzes the pattern of the load current measurement value (S140).

The main body control unit 195 analyzes the pattern of the load current measurement value on the basis of the first reference value, the second reference value, and the third reference value described with reference to FIG. 7. Because the specific embodiment of this configuration has been described above, a repeated description thereof will be omitted.

Meanwhile, in step S140, the pattern of the load current measurement value may be analyzed even by other methods other than the method using the first reference value, the second reference value, or the third reference value. That is, in the above-mentioned embodiment, the load current measurement value is analyzed by using three reference values as threshold values in three detection regions. Alternatively, the pattern of the load current measurement value may be analyzed in a statistically probabilistic way on the basis of current data acquired for each ADC sampling cycle, e.g., 10 ms. For example, in case that the number of times the carpet nozzle is detected is 5 and the number of times the fluffy nozzle is detected is 2 for the nozzle detection time on the basis of the data acquired for each sampling cycle, the pattern may be analyzed as the pattern with the probability that the cleaning nozzle is the carpet nozzle.

Next, on the basis of the result of analyzing the load current measurement value pattern, the main body control unit 195 determines the type of cleaning nozzle currently connected to the main body 100 (S150).

If the result of analyzing the load current measurement value pattern indicates that the first reference value or less (the first threshold value or less for the first detection time) is satisfied, the cleaning nozzle currently connected to the main body 100 may be determined as the bedding nozzle with the lowest rotational speed per minute of the nozzle drive part and the smallest load current value.

If the result of analyzing the load current measurement value pattern indicates that the second reference value or less (the second threshold value or less for the second detection time) is satisfied, the cleaning nozzle currently connected to the main body 100 may be determined as the wet mop rag nozzle 300 including the nozzle control unit 195.

If the result of analyzing the load current measurement value pattern indicates that the third reference value or more (the third threshold value or more for the third detection time) is satisfied, the cleaning nozzle currently connected to the main body 100 may be determined as the carpet nozzle having a relatively higher rotational speed per minute relatively than the other cleaning nozzles but having a small reduction ratio.

If the result of analyzing the load current measurement value pattern indicates that the value less than the third reference value (less than the third threshold value for the third detection time) is satisfied, the cleaning nozzle currently connected to the main body 100 may be determined as the fluffy nozzle having a high reduction ratio, unlike the carpet nozzle.

Meanwhile, in step S100, when the type of cleaning nozzle connected to the main body 100 is detected, the main body control unit 195 may control the cleaning operation corresponding to the detected cleaning nozzle.

More specifically, when the detected cleaning nozzle is the suction nozzle 200, such as the carpet nozzle and the fluffy nozzle, the main body control unit 195 may maintain the operation of the suction motor 140. In this case, the nozzle drive part 230 of the suction nozzle 200 may be operated by power transmitted to the suction nozzle 140 by the main body control unit 195 and the control of the main body control unit 195.

In case that the detected cleaning nozzle is the wet mop rag nozzle 300, the main body control unit 195 may perform control to stop the operation of the suction motor 140. In this case, the operation part of the wet mop rag nozzle 300 may be operated by the power transmitted to the wet mop rag nozzle 300 by the main body control unit 195 and the control of the nozzle control unit 395.

With reference back to FIG. 10, the control method is disclosed when the user manipulates the input buttons 162 and 163 during the cleaning process (S200).

In this case, the operation of the cleaner may vary (S400) depending on the type of the cleaning nozzle currently connected to the main body 100 (S300).

That is, the control target varies depending on the type of cleaning nozzle currently connected to the main body 100 even though the user manipulates the input buttons 162 and 163.

A control method S410 when the cleaning nozzle connected to the main body 100 is the wet mop rag nozzle 300 will be more specifically with reference to FIG. 12.

In case that the input button manipulated by the user is the first input button 162 (S411), the main body control unit 195 generates the first control instruction with the changed first frequency (S412). The first control instruction is a signal made by changing the voltage supplied by the battery 175 by the PWM method.

The first control instruction is transmitted to the nozzle control unit 395 from the main body control unit 195 through the power line (S413). In this case, the first control instruction may be the control instruction that designates the wet mop rag rotation part 360 to the control target for the nozzle control unit 395.

The nozzle control unit 395 may control the wet mop rag motor 362 so that the current rotational speed is alternately increased and decreased each time the first control instruction on the basis of the manipulation of the first input button 162 is received (S414).

The wet mop rag motor 362 rotates at a preset reference speed during the initial operation, and the speed may be increased when the first input button 162 is manipulated. When the first input button 162 is manipulated again in the state in which the speed is increased, the speed may be decreased to the reference speed again.

In case that the input button manipulated by the user is the second input button 163 (S411), the main body control unit 195 generates the second control instruction with the changed second frequency (S415). The second control instruction is a signal made by changing the voltage supplied by the battery 175 by the PWM method.

Meanwhile, the first switching frequency and the second switching frequency may be frequencies with different values and have the same duty ratio so that the constant voltage is transmitted to the nozzle control unit 195.

The second control instruction is transmitted to the nozzle control unit 395 from the main body control unit 195 through the power line (S416). In this case, the second control instruction may be the control instruction that designates the fluid spray part 340 to the control target for the nozzle control unit 395.

Each time the second control instruction is received on the basis of the manipulation of the second input button 163, the nozzle control unit 395 may control the operation of the water pump 341 so that the fluid spray part 340 sprays the fluid forward in a traveling direction of the wet mop rag nozzle 300 (S417).

More specifically, the nozzle control unit 395 may perform control to operate the motor of the water pump 341 to spray the fluid. In this case, the amount of fluid to be sprayed may be preset to the nozzle control unit 395, and the nozzle control unit 395 may control the amount of fluid to be sprayed by adjusting the time for which the motor of the water pump 341 operates.

Next, a control method S420 when the cleaning nozzle connected to the main body 100 is the suction nozzle 200 will be more specifically with reference to FIG. 13.

In case that the input button manipulated by the user is the first input button 162 (S421), the main body control unit 195 may perform control so that the speed of the suction motor 140 is higher than the current speed. In this case, the suction force is increased (S422). In case that the input button manipulated by the user is the second input button 163 (S421), the main body control unit 195 may perform control so that the speed of the suction motor 140 is lower than the current speed. In this case, the suction force is decreased (S423).

The speed control of the suction motor 140 may be implemented by controlling the current to be applied to the suction motor 140 by the main body control unit 195.

Meanwhile, in the embodiment of the present disclosure, the first input button 162 has been described as being the input button for the speed increase control of the suction motor 140 and the speed control of the wet mop rag 361, and the second input button 163 has been described as being the input button for the speed decrease control of the suction motor 140 and the control of the fluid spray part 340.

However, it should be noted that the embodiment of the present disclosure is not limited thereto. That is, the first input button 162 may be implemented as the input button for the speed increase control of the suction motor 140 and the input button for controlling the fluid spray part 340. The second input button 163 may be implemented as the input button for the speed decrease control of the suction motor 140 and the input button for the speed control of the wet mop rag 361.

As described above, according to the present disclosure, the main body of the cleaner detects the cleaning nozzle connected to the main body by analyzing the load current measurement value pattern and generates different control instructions in accordance with the manipulation of the input button corresponding thereto. Therefore, it is possible to control various functions of the cleaning nozzles connected to the main body by using a limited number of input buttons.

In addition, according to the present disclosure, the different control instructions generated by the main body are converted to have different switching frequencies and transmitted to the cleaning nozzle through the power line communication. Therefore, it is possible to transmit the control instruction, which is generated by the main body, to the cleaning nozzle only through power line communication without adding a communication line or a wireless communication module.

The invention claimed is:

1. A cleaner comprising:

a main body; and a cleaning nozzle separably connected to the main body, wherein the main body comprises:

a battery configured to supply power;

an operating part comprising a first input button and a second input button; and a main body control unit configured to receive a user input for manipulating the input buttons and transmit a control instruction to the cleaning nozzle when the cleaning nozzle is connected to the main body, and wherein the cleaning nozzle comprises:

a nozzle control unit configured to receive the control instruction through a power line connected to the main body control unit; and at least one operation part configured such that an operation of the operation part related to a function of the cleaning nozzle is controlled by the nozzle control unit, wherein the cleaning nozzle, as the operation part, is a wet mop rag nozzle comprising:

a fluid spray part configured to spray a fluid by operating a water pump; and a wet mop rag rotation part configured to rotate at least one wet mop rag by operating a wet mop rag motor;

wherein the nozzle control unit controls a magnitude of an output of the wet mop rag motor so that a rotational speed of the wet mop rag is changed when the first input button is manipulated, and wherein the nozzle control unit controls an operation of the water pump to allow the fluid spray part to spray a fluid forward in a traveling direction of the wet mop rag nozzle when the second input button is manipulated.

2. The cleaner of claim 1, wherein the main body control unit applies power, which is supplied from the battery, to the cleaning nozzle when the cleaning nozzle is connected to the main body and initially operates.

3. The cleaner of claim 1, wherein the main body control unit generates the control instruction by changing a voltage, which is supplied from the battery, to a PWM signal, and the PWM signal changes a switching frequency depending on input button manipulated by the user.

4. The cleaner of claim 3, wherein the nozzle control unit controls the operation part matched with the received switching frequency.

5. The cleaner of claim 1, wherein the nozzle control unit controls the wet mop rag motor so that a rotational speed alternately increases and decreases in comparison with a current rotational speed each time the control instruction based on the manipulation of the first input button is received.

6. The cleaner of claim 1, wherein the operation part further comprises an LED emission part configured to emit light forward in a movement direction of the wet mop rag nozzle.

7. The cleaner of claim 6, wherein the nozzle control unit controls brightness of an LED included in the LED emission part on the basis of illuminance of a periphery of the wet mop rag nozzle.

8. A cleaner comprising:

a main body; and a cleaning nozzle separably connected to the main body, wherein the main body comprises:

a battery configured to supply power;

an operating part comprising a first input button and a second input button; and a suction motor configured to generate a suction force by rotating, and wherein an operation according to manipulation of one of the first input button and the second input button varies depending on the type of the cleaning nozzle connected to the main body;

wherein the cleaning nozzle connected to the main body is a wet mop rag nozzle comprising a fluid spray part configured to spray a fluid by operating a water pump, and a wet mop rag rotation part configured to rotate at least one wet mop rag by operating a wet mop rag motor, a speed of the wet mop rag motor is changed by the manipulation of the first input button, and the water pump is operated by the manipulation of the second input button.

9. The cleaner of claim 8, further comprising a suction nozzle; wherein when the wet mop rag nozzle is in a separated state from the main body the suction nozzle is capable of being separably connected to the main body, the suction nozzle configured to suck dust on a cleaning target surface, a speed of the suction motor is configured to be increased to be higher than a current speed by the manipulation of one of the first input button and the second input button, and the speed of the suction motor is decreased to be lower than the current speed by the manipulation of the other of the first input button and the second input button.

10. The cleaner of claim 8, wherein the cleaning nozzle performs control so that a speed of the wet mop rag motor alternately increases and decreases in comparison with a current rotational speed each time the first input button is manipulated by a user.

11. The cleaner of claim 8, wherein the main body applies power, which is supplied from the battery, to the cleaning nozzle when the cleaning nozzle is connected to the main body and initially operates.

* * * * *